(12) United States Patent
Fan et al.

(10) Patent No.: US 8,149,456 B2
(45) Date of Patent: Apr. 3, 2012

(54) COLOR PROCESSING METHOD AND IMAGE FORMING APPARATUS FOR CREATING A COLOR SEPARATION TABLE

(75) Inventors: Yingying Fan, Tokyo (JP); Kazuhiro Saito, Yokohama (JP); Takayuki Ogasahara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 781 days.

(21) Appl. No.: 12/237,270

(22) Filed: Sep. 24, 2008

(65) Prior Publication Data

US 2009/0086225 A1 Apr. 2, 2009

(30) Foreign Application Priority Data

Sep. 28, 2007 (JP) .................................. 2007-256008
Nov. 27, 2007 (JP) .................................. 2007-306305

(51) Int. Cl.
*G06K 1/00* (2006.01)
*G06K 9/00* (2006.01)

(52) U.S. Cl. ......... 358/1.9; 358/2.1; 358/3.03; 358/501; 358/504; 358/515; 358/518; 358/520; 358/296; 358/496; 358/498; 382/162; 382/163; 382/164; 382/165; 382/167; 382/229; 382/232; 382/254; 382/255; 382/260; 382/612; 399/27; 399/28; 399/39; 399/41; 399/54; 399/171; 399/178; 399/184; 399/298; 347/15; 347/24; 347/43; 347/100; 347/175; 347/176; 347/177; 347/178; 345/88; 345/549; 345/589; 345/590; 345/591; 345/593; 345/596; 345/597; 345/600; 345/604

(58) Field of Classification Search .................. None
See application file for complete search history.

(56) References Cited

U.S. PATENT DOCUMENTS

| | | | |
|---|---|---|---|
| 2003/0076516 A1* | 4/2003 | Saito | 358/1.9 |
| 2004/0183814 A1 | 9/2004 | Saito | |
| 2005/0094171 A1* | 5/2005 | Ogasahara | 358/1.9 |
| 2005/0275858 A1* | 12/2005 | Fan et al. | 358/1.9 |
| 2007/0064251 A1 | 3/2007 | Fan | |

FOREIGN PATENT DOCUMENTS

| | | |
|---|---|---|
| EP | 1392050 A2 | 2/2004 |
| EP | 1524844 A2 | 4/2005 |
| JP | 2003-334934 A | 11/2003 |
| JP | 2004-147265 A | 5/2004 |
| WO | 03-095212 A1 | 11/2003 |

\* cited by examiner

*Primary Examiner* — Steven Kau
(74) *Attorney, Agent, or Firm* — Carter, DeLuca, Farrell & Schmidt LLP

(57) ABSTRACT

Restriction information on a total colorant amount for a medium is obtained. Patches at grid points in a color space corresponding to a plurality of colorants at which the total colorant amount falls within a restriction represented by the restriction information, and a patch at a point surrounded by the patches are generated. Color values are obtained by measuring the colors of the patches printed on the medium. It is determined based on a color prediction value between the grid points whether the measured color values are appropriate, and if so, a color value at a grid point at which the total colorant amount exceeds the restriction is estimated based on the measured color values. A color separation table is created based on the measured color values and the estimated value.

15 Claims, 23 Drawing Sheets

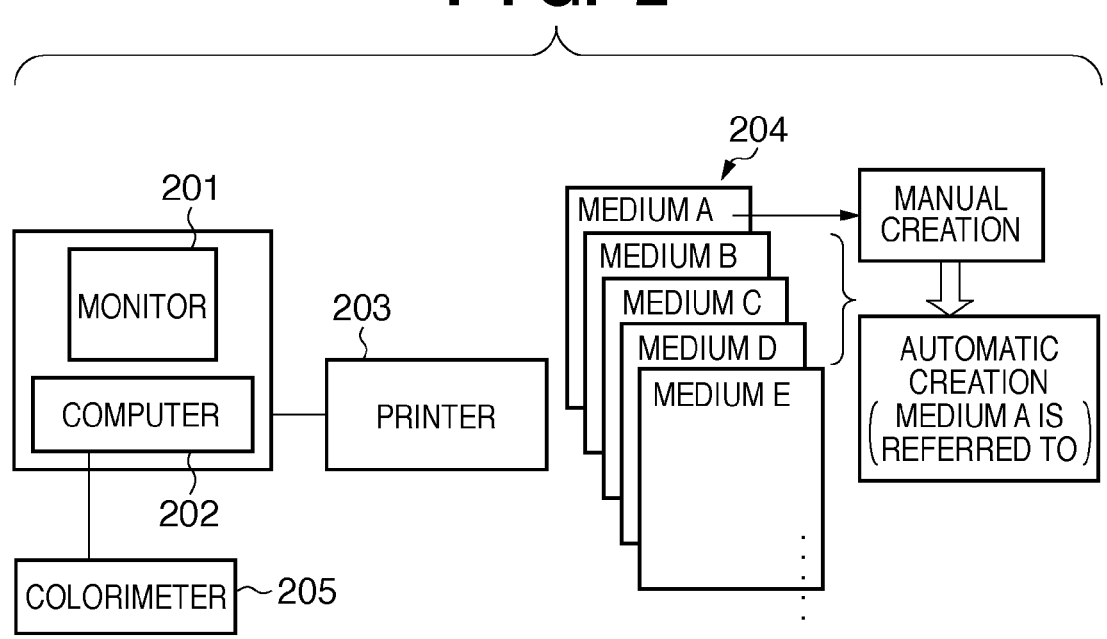
F I G. 2

F I G. 18
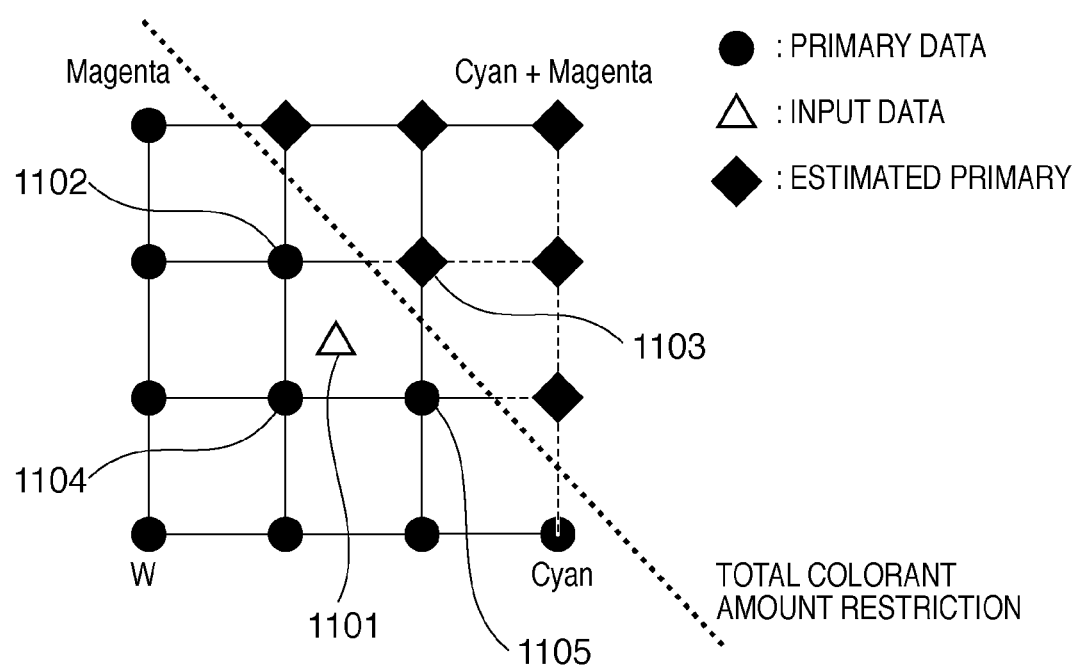

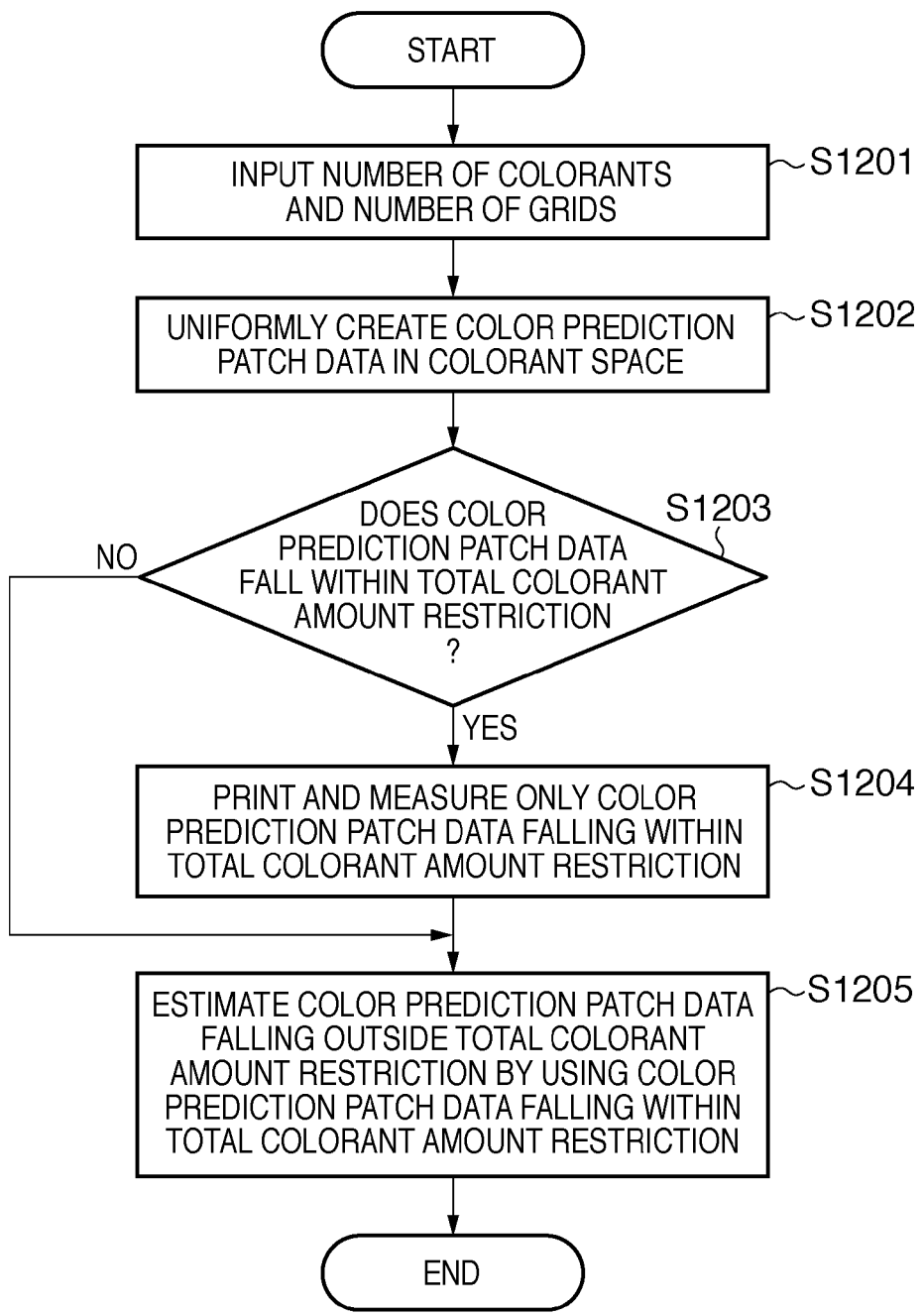

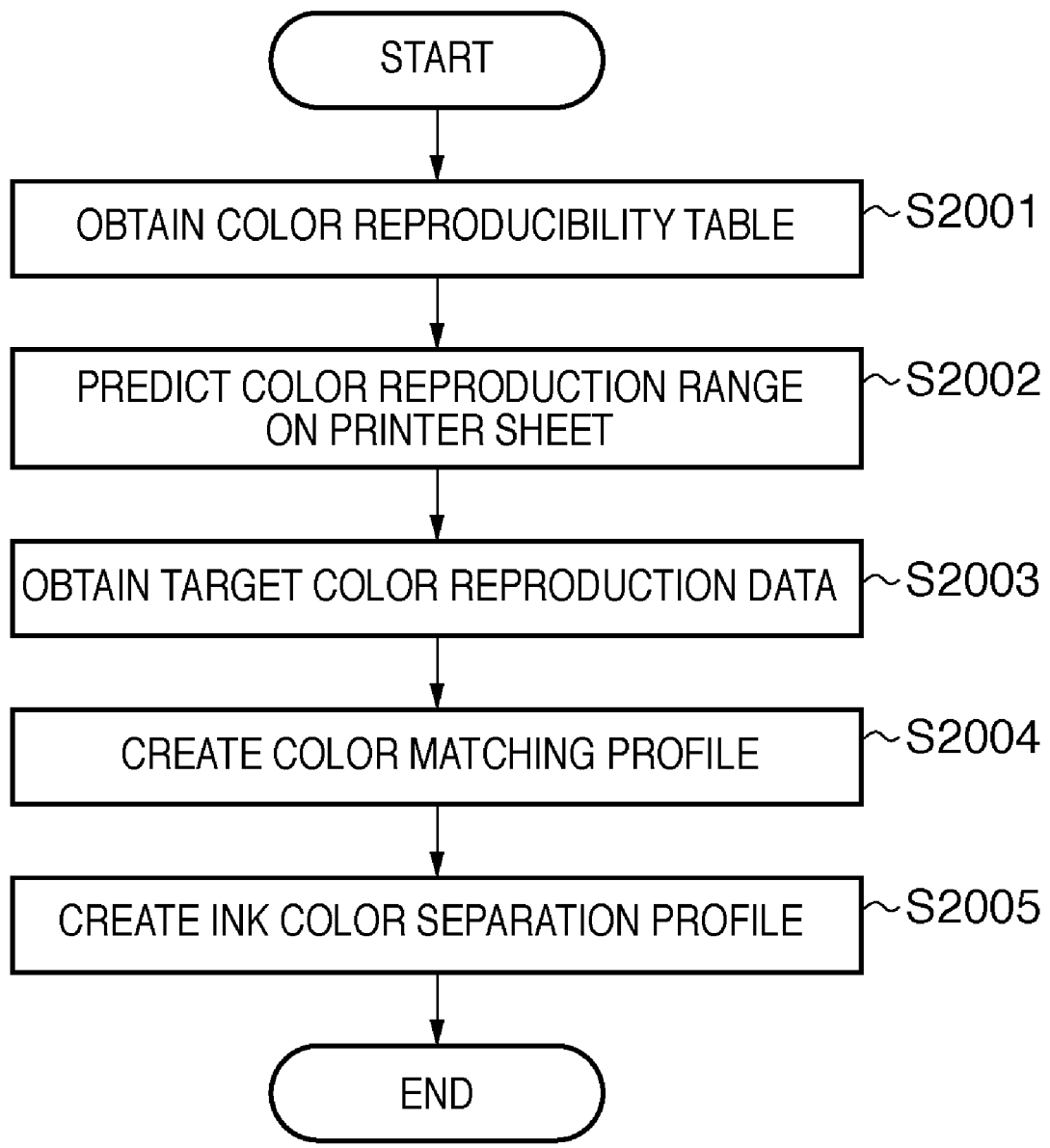

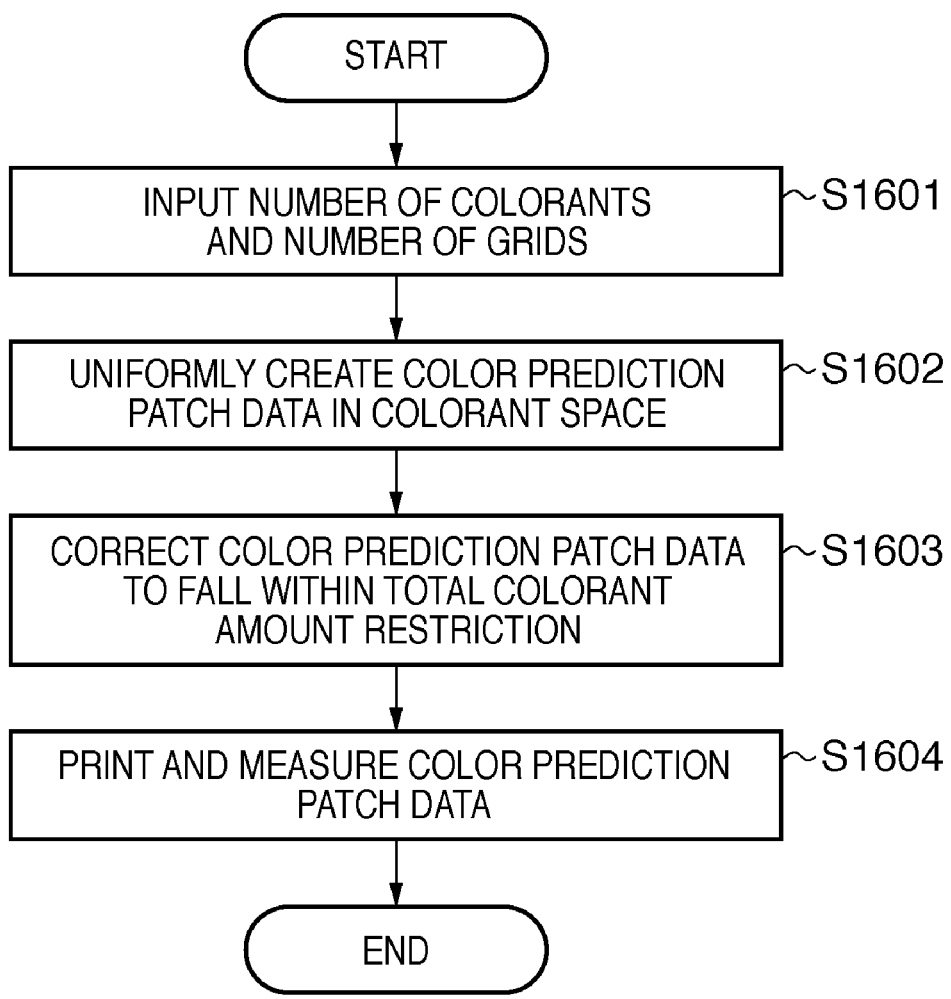

COLOR PROCESSING METHOD AND IMAGE FORMING APPARATUS FOR CREATING A COLOR SEPARATION TABLE

BACKGROUND OF THE INVENTION

1. Field of the Invention

The present invention relates to a color processing method and image forming apparatus for creating a color separation table used to separate image data into data of a plurality of colorants.

2. Description of the Related Art

Along with recent improvement in the quality of formed images in image forming apparatuses such as color printers which visualize color images on print media, standards of user demands for media are rising. To meet these standards, one printer needs to handle various types of media, and output a high-quality image on any medium.

Generally, a color printing system using a color printer or the like executes a color separation process to separate color image data to be formed into the respective amounts of colorants (inks or toners) in the color printer. The color separation process is performed based on a color separation table created in advance. However, an optimal color separation process changes depending on the type of medium. Therefore, a plurality of color separation tables are preferably prepared to implement optimal color separation processes for respective media types.

According to a conventional technique, the color separation table is manually created, so designing color separation tables for various types of media greatly prolongs the design period. To quickly create color separation tables for various types of media, a technique for automatically generating a color separation table relating to an arbitrary type of medium is required.

In general, items in the color separation table have a trade-off relationship: if the color gamut is widened, the tonality is impaired depending on the colorant to be used. Thus, the user needs to adjust an automatically generated color separation table accordingly.

In a generated color separation table, when the illuminant changes, the color gamut may change or the tonality may suffer. Thus, a color separation table needs to be created for each illuminant. It is desirable to allow the user to adjust a color separation table corresponding to an illuminant by using a user interface which visualizes the color separation table in the Lab space.

As described above, when automatically generating a color separation table corresponding to a medium, the color separation table needs to be optimized in accordance with the illuminant. In other words, a tool (user interface) is necessary to allow the user to arbitrarily adjust a created color separation table. Creating such a user interface requires a color prediction technique capable of simulating a mixed color development characteristic without printing a color patch on a medium or measuring the color.

According to the color prediction technique of simulating a color development characteristic upon mixing colorants, it is necessary to divide the colorant space into grids, print all grid points (to be referred to as primaries hereinafter), and measure the color. However, some primaries cannot be printed owing to the restriction on the total colorant amount on a medium. For such an unprintable primary, there is proposed a technique of making primaries strictly observe the total colorant amount restriction by simple linear correction (see, for example, Japanese Patent Laid-Open No. 2003-334934). However, when a primary is linearly corrected in accordance with the total colorant amount restriction, the linear relationship with peripheral primaries is lost, decreasing the color predictability. In addition, if the number of colorants for use increases, the number of primaries and the printing load also increase.

The color prediction process uses a color reproducibility look up table which defines the spectral value of each primary with respect to a medium for use. The color reproducibility table looked up in the color prediction process will be explained with reference to FIGS. 14 and 15.

FIG. 14 is a flowchart showing a conventional color reproducibility table creation process.

In step S1401, parameters are input. The parameters are data such as total colorant amount restriction information of a medium, and the number and pitch of grids in an ink space. In step S1402, after all primaries are generated, primaries which are printable because the total colorant amount falls within the total colorant amount restriction are generated as patches. In step S1403, the patches generated in step S1402 are printed on a medium to measure the color. In step S1404, the color measurement results are input.

In step S1405, the color measurement values of primaries which are unprintable because the total colorant amount exceeds the total colorant amount restriction need to be estimated using the color measurement values. By these steps, the color measurement values, that is, the spectral values of all primaries can be obtained.

The created color reproducibility table enables color prediction at an arbitrary point in the color space including primaries. More specifically, when the signal value of a point subjected to prediction is input, the spectral value of the point can be output by executing color prediction by a known cellular Neugebauer process based on the color measurement values of primaries around the point in the color reproducibility table.

FIG. 15 is a view showing an example of printable and unprintable primaries when two, cyan (C) and magenta (M) inks are used. In FIG. 15, frame lines between four points W, C, M, and C+M are divided by the number of grids (three in this example) to obtain primaries. In this example, each frame line is equally divided into three at points 0, 85, 170, and 255. In FIG. 15, the symbol ● represents a printable primary falling within the total colorant amount restriction indicated by a dotted line, and each printable primary is formed as a color prediction patch. The symbol ○ represents an unprintable primary exceeding the total colorant amount restriction. An unprintable primary attains an appropriate spectral value by the color prediction process using the above-mentioned color prediction patches.

However, the color reproducibility table creation process suffers from the following problems. The calculation for estimating a primary assumes that created patches are properly printed. If the patch of a printable primary has not been printed appropriately for some reason, the reliability of the estimation result of an unprintable primary becomes poor. In this case, the precision of a color reproducibility table created based on estimated primaries decreases. The precision of a color separation table created by color prediction looking up the color reproducibility table also decreases.

SUMMARY OF THE INVENTION

The present invention has been made to address the aforementioned problems, and has as its object to provide a color processing method and image forming apparatus having the following features. That is, appropriate color measurement values are obtained at all grid points in a color space corresponding to a plurality of colorants by determining whether patches used to create color reproducibility information of a medium have appropriately been printed. From these color measurement values, color reproducibility information is properly generated to create an appropriate color separation table by color prediction using the color reproducibility information.

The present invention in one aspect provides a color processing method for creating a color separation table for separating image data into data of a plurality of colorants, the method comprising the steps of acquiring restriction information on a total colorant amount for a medium, generating patches at grid points in a color space corresponding to the plurality of colorants, at which grid points the total colorant amount falls within a restriction represented by the restriction information, and generating a patch at a point surrounded by the grid points, obtaining color measurement values by measuring the colors of the patches printed on the medium, determining whether the color measurement values obtained in the obtaining step are appropriate, based on a color prediction value between the grid points, estimating, based on the color measurement values, a color measurement value at a grid point at which the total colorant amount exceeds the restriction represented by the restriction information when the color measurement values are determined in the determination step to be appropriate, and creating the color separation table based on the color measurement values obtained in the obtaining step and the color measurement value estimated in the estimating step.

Further features of the present invention will become apparent from the following description of exemplary embodiments with reference to the attached drawings.

BRIEF DESCRIPTION OF THE DRAWINGS

FIG. 2 is a view showing a system configuration of an embodiment;

FIG. 18 is a view showing an example of a primary patch in an embodiment;

FIG. 19 is a flowchart showing a color reproducibility table creation process in an embodiment;

FIG. 20 is a flowchart showing a profile creation process in the embodiment;

FIG. 23 is a flowchart showing a conventional color prediction patch data creation process.

DESCRIPTION OF THE EMBODIMENTS

Various exemplary embodiments, features, and aspects of the present invention will now be described in detail below with reference to the drawings.

First Embodiment

Output Process

Figure 1:
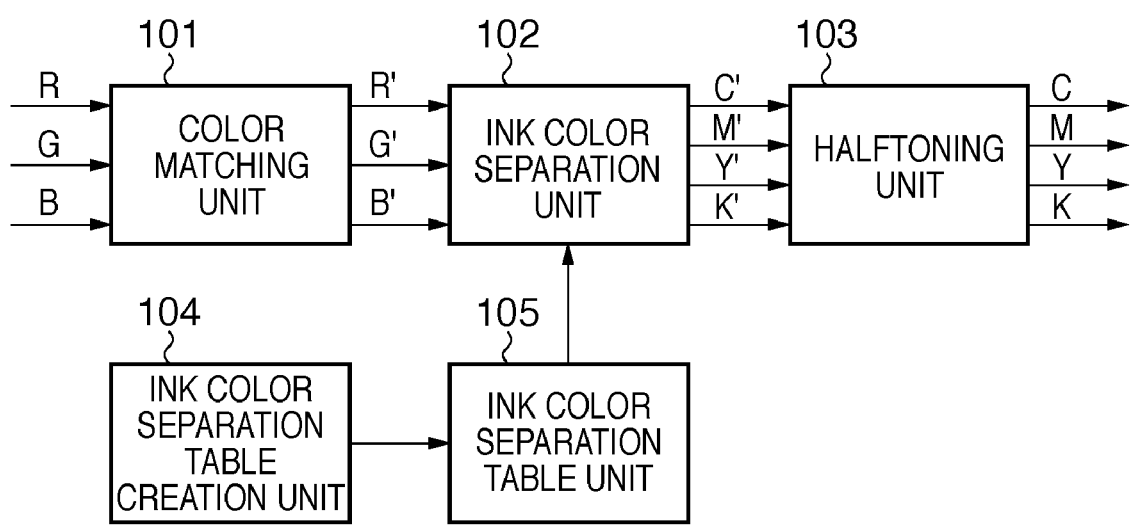
FIG. 1 is a block diagram showing an image output section in a color printer in an embodiment according to the present invention.

FIG. 1 is a block diagram showing an image output section of a color printer according to the first embodiment. In FIG. 1, a color matching unit 101 matches the reproducibility of input R, G, and B data with printer colors. An ink color separation unit 102 converts multilevel R', G', and B' data output from the color matching unit 101 into C', M', Y', and K' data, which are the colors of printer colorants. A half-toning unit 103 converts multilevel C', M', Y', and K' data output from the ink color separation unit 102 into tones expressible by the printer, and outputs C, M, Y, and K data. An ink color separation table unit 105 provides an ink color separation table to be looked up in an interpolation process by the ink color separation unit 102. An ink color separation table creation unit 104 creates an ink color separation table to be held in the ink color separation table unit 105. The ink color separation table will also be simply referred to as a "color separation table".

FIG. 2 is a view showing a system configuration in the first embodiment. In FIG. 2, a computer 202 holds input image data, and has an input unit (not shown) such as a mouse or keyboard for inputting a user instruction. A monitor 201 displays image data held in the computer 202. A color printer 203 prints image data held in the computer 202. In the above-described process arrangement shown in FIG. 1, the ink color separation table creation unit 104 is incorporated in the computer 202, and the remaining units are incorporated in the printer 203. It is also possible to incorporate all the units in the computer 202, and input C, M, Y, and K data from the half-toning unit 103 to the printer 203.

A print process in the first embodiment will be explained with reference to FIGS. 1 and 2. Image data held in the computer 202 are transmitted to the printer 203 via a cable, a network (not shown), or the like in printing.

In the printer 203, the color matching unit 101 executes color matching for the transmitted R, G, and B image data to match them with the color reproducibility of the monitor 201 used by the user. The ink color separation unit 102 separates the R', G', and B' data having undergone the color matching into C, M, Y, and K ink colors in the printer 203 by interpolation based on a created color separation table held in the ink color separation table unit 105. The half-toning unit 103 converts the C', M', Y', and K' multilevel data having undergone the ink color separation into C, M, Y, and K data corresponding to tones reproducible by the printer 203. Then, the C, M, Y, and K data are printed on a medium set in advance.

In FIG. 2, media 204 (five types of media A to E in this example) are printable by the printer 203. The first embodiment prepares ink color separation tables corresponding to respective types of printable media. Since the printer 203 holds color separation tables corresponding to medium types, ink color separation optimal for the medium type is executed. The ink color separation table has been generated in advance by the ink color separation table creation unit 104, and the generation method will be described later.

Reference numeral 205 denotes a calorimeter. When creating an ink color separation table in the first embodiment, a color reproducibility table prepared in advance for each medium is looked up. To create the color reproducibility table, the calorimeter 205 measures the color of the patch of a printed primary, and inputs the color measurement result to the computer 202. The calorimeter 205 may also be connected to the computer via a network, and color measurement may also be done at another place via a network.

(Ink Color Separation Table)

Figure 3:
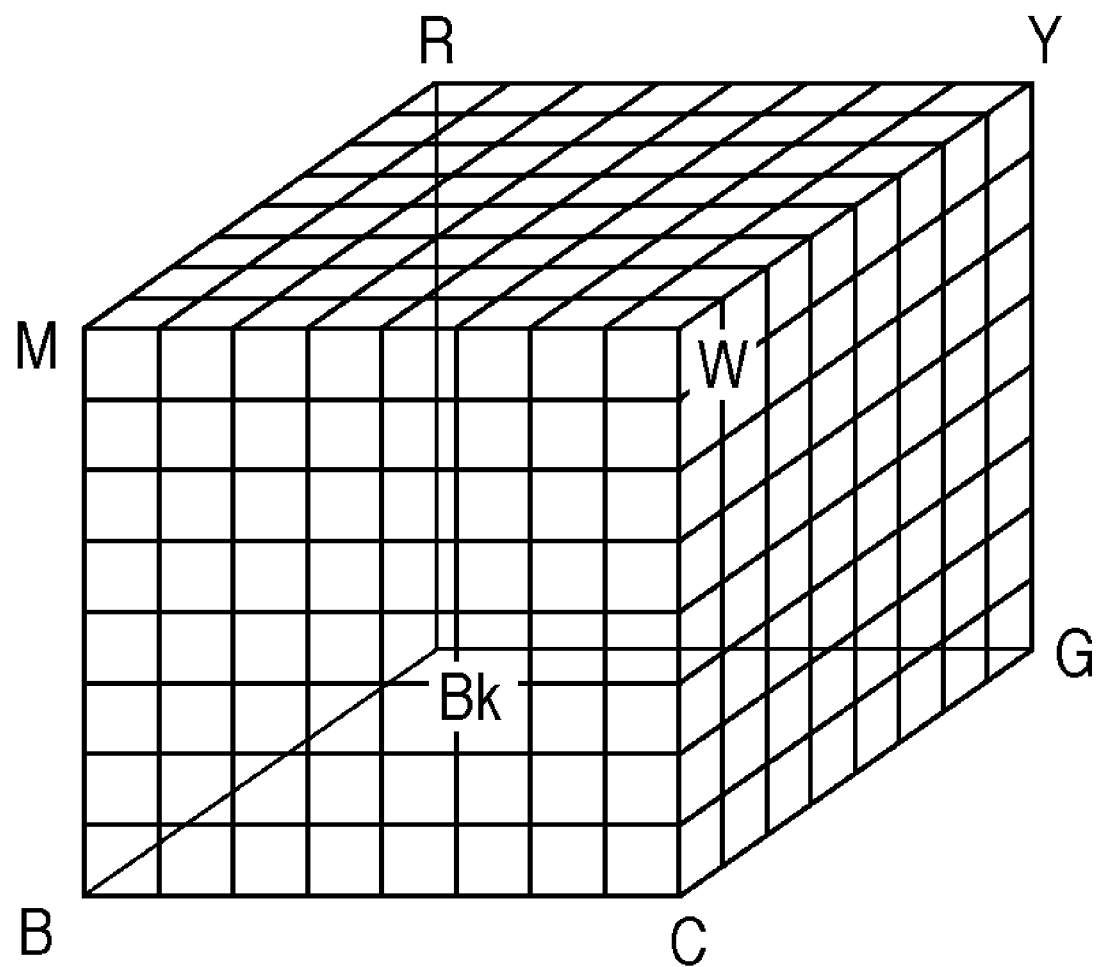
FIG. 3 is a view showing the structure of an ink color separation table in an embodiment.

FIG. 3 is a view showing the structure of a color separation table held in the ink color separation table unit 105. The color separation table stores, as table data, data corresponding to grid points in a cube in the 3D RGB space in correspondence with input R', G', and B' data. When input R', G', and B' data do not exist on the grids of the color separation table, the ink color separation unit 102 executes interpolation using neighboring grid point data. As the interpolation method, various methods are proposed including tetrahedral interpolation and cubic interpolation, and any interpolation method is available.

A basic ink color separation table creation method by the ink color separation table creation unit 104 will now be described.

Figure 4:
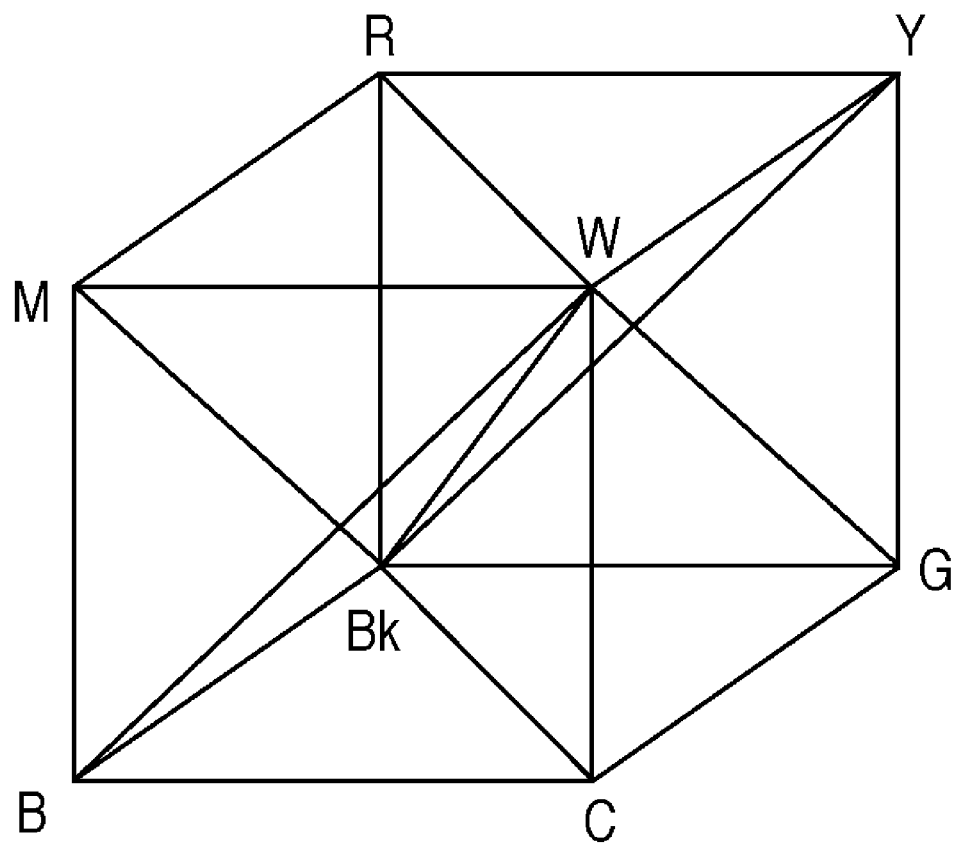
FIG. 4 is a view showing a cube in the RGB color space serving as a color separation table in an embodiment.

FIG. 4 is a view showing a cube in the RGB color space for explaining an ink color separation table creation method in the first embodiment. W, C, M, Y, R, G, B, and Bk represent eight vertices of the cube. Thick solid lines represent all 19 lines connecting W-Bk, W-C, W-M, W-Y, W-R, W-G, W-B, Bk-C, Bk-M, Bk-Y, Bk-R, Bk-G, Bk-B, M-R, R-Y, Y-G, G-C, C-B, and B-M. When the number of bits of input data in the ink color separation unit 102 is 8, the coordinates of the vertices W. C, M, Y, R, G, B, and Bk are given by W=(255,255,255): representing white, that is, the color of a medium itself.

C=(0,255,255): representing cyan primary color.

M=(255,0,255): representing magenta primary color.

Y=(255,255,0): representing yellow primary color.

R=(255,0,0): representing red primary color.

G=(0,255,0): representing green primary color.

B=(0,0,255): representing blue primary color.

Bk=(0,0,0): representing black, that is, the darkest point of a printer.

First, the ink color separation table creation unit 104 creates table data of lines indicated by thick solid lines in FIG. 4 that connect W-C, W-B, W-M, W-Y, W-R, W-G, B-Bk, M-R, R-Y, Y-G, G-C, C-B, B-M, Bk-C, Bk-M, Bk-Y, Bk-R, Bk-G and W-Bk. Then, for ink colors corresponding to inner grid points, the ink color separation table creation unit 104 performs internal interpolation to create all table data.

Although the printer 203 in the first embodiment can handle a plurality of types (e.g., five types) of media, as described above, an example using two types of media will be explained for descriptive convenience. More specifically, the printer 203 can use medium A serving as the first type of medium, and medium B serving as the second type of medium, and color separation tables are prepared for the respective media.

In order to prepare different color separation tables for respective media, it is possible to manually create tables for all the medium types, that is, manually input table data of lines indicated by thick solid lines in FIG. 4. However, this method cannot easily create color separation tables for a plurality of types of media. Thus, the process of the first embodiment manually creates a color separation table for a given representative medium type, and then automatically creates color separation tables for other medium types based on the manually created color separation table. That is, the process of the first embodiment manually creates a color separation table for medium A, and then creates that for medium B based on the color separation table of medium A.

(Automatic Color Separation Table Creation Process)

An automatic color separation table creation process by the ink color separation table creation unit 104 in the first embodiment will now be described.

Figure 5:
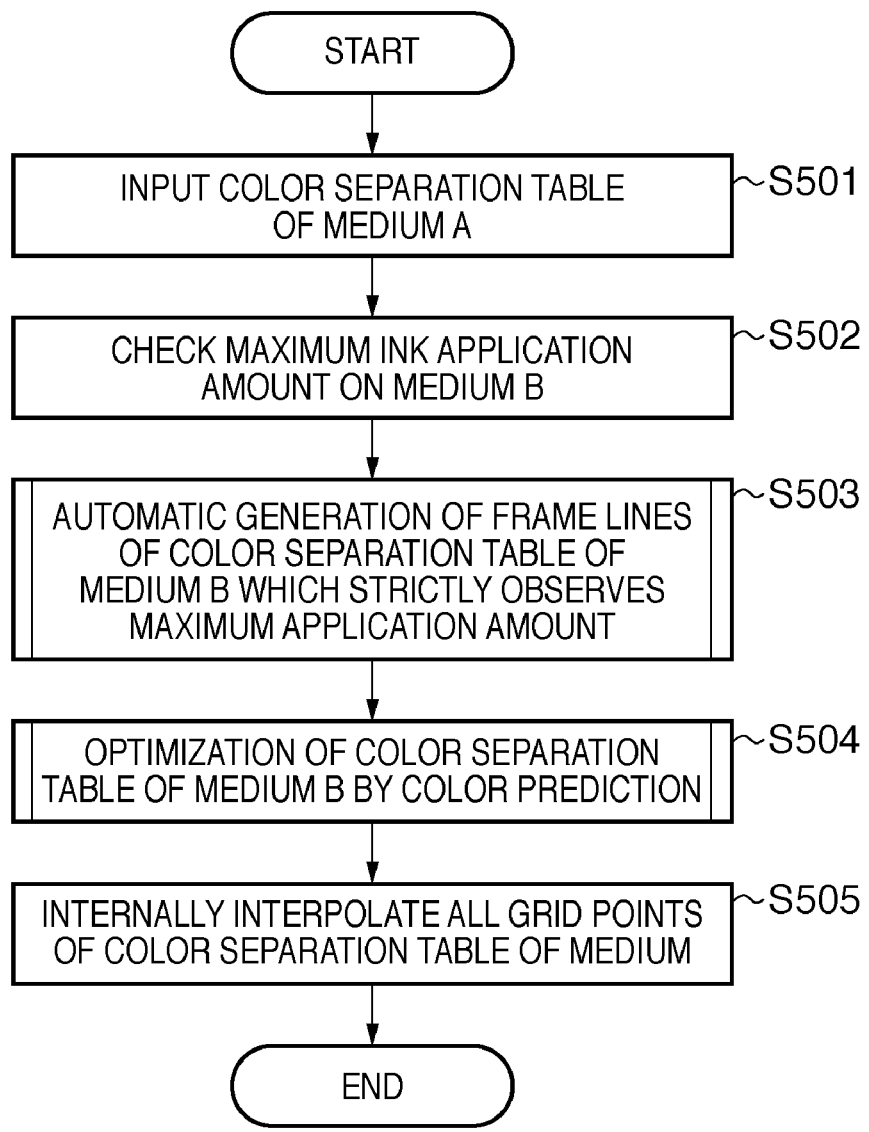
FIG. 5 is a flowchart showing an automatic color separation table creation process in an embodiment.

FIG. 5 is a flowchart showing an automatic color separation table creation process for medium B by the ink color separation table creation unit 104.

In step S501, the ink color separation table creation unit 104 obtains the color separation table of medium A. Assume that the color separation table of medium A has already been manually created and is held in the ink color separation table unit 105. In step S502, the ink color separation table creation unit 104 obtains total colorant amount restriction information of medium B. The total colorant amount restriction information of medium B may also be input from the user via an input unit (not shown), or obtained from a table held in advance in the computer 202. The total colorant amount restriction information defines a total colorant amount which does not generate a smudge or the like on medium B.

In step S503, the ink color separation table creation unit 104 automatically generates the frame lines of the color separation table of medium B in accordance with the total colorant amount restriction information of medium B so as to observe the total colorant amount restriction. Details of the automatic frame line generation process will be described later. In step S504, the ink color separation table creation unit 104 optimizes the frame lines by color prediction. Details of the optimization process by color prediction will be described later. In step S505, the ink color separation table creation unit 104 performs internal interpolation to generate data at all grid points within the frame of the color separation table of medium B. As a result, the final color separation table of medium B is completed.

The total colorant amount restriction defined in step S502 may also be a value which slightly causes a smudge or the like, and is not limited to a value which does not cause any smudge.

(Automatic Color Separation Table Frame Line Generation Process (Details))

Figure 6:
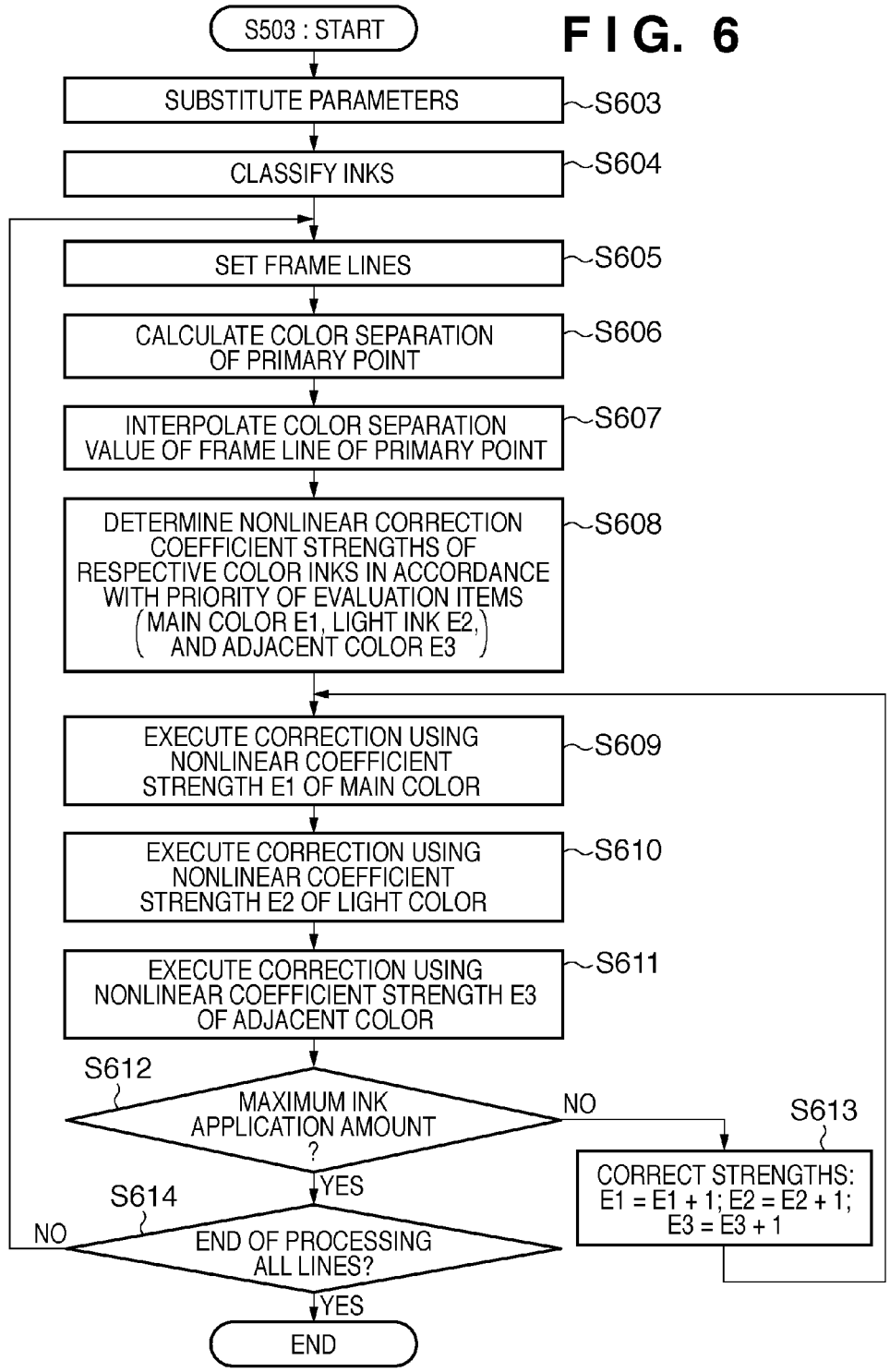
FIG. 6 is a flowchart showing a process to automatically generate the frame lines of a color separation table which strictly observes the maximum ink application amount in an embodiment.

FIG. 6 is a flowchart showing the process in step S503 of FIG. 5 that automatically generates the frame lines of a color separation table which strictly observes the total colorant amount on medium B. This process automatically generates the frame lines of the color separation table of medium B based on the manually created color separation table of medium A.

In step S603, the ink color separation table creation unit 104 obtains various parameters such as the priority of evaluation items for a formed image, and the nonlinear correction coefficient for nonlinear interpolation. In step S604, the ink color separation table creation unit 104 classifies ink colors available in the printer 203. In this example, ink colors are classified into three types: main color, light color, and adjacent color. More specifically, C, M, Y, and K inks are classified into main colors. Light cyan (Lc), light magenta (Lm), dark gray (Lk1), and light gray (Lk2) inks are classified into light colors. R, G, and B inks are classified into adjacent colors.

In step S605, the ink color separation table creation unit 104 sets the frame lines of the color separation table of medium B based on the color separation table of medium A. The frame lines are a total of 19 lines connecting W-Bk, W-C, W-M, W-Y, W-R, W-G, W-B, Bk-C, Bk-M, Bk-Y, Bk-R, Bk-G, Bk-B, M-R, R-Y, Y-G, G-C, C-B, and B-M. More specifically, information on switching points between Bk and the remaining colors in under color removal (UCR), and information on the separation ratio of respective colorant colors are obtained for each frame line from the color separation table of medium A.

Each of the 19 frame lines sequentially undergoes the following process. As the process order, lines connecting points W and Bk to color points C, M, Y, R, G, and B are processed first, and then lines connecting color points are processed.

In this case, points C, M, Y, R, G, B, Bk, and W in the color space are defined as primary points.

In step S606, the ink color separation table creation unit 104 calculates the color separation values of the primary points on the frame lines set in step S605 so as to observe the total colorant amount restriction information of medium B. In step S607, the ink color separation table creation unit 104 interpolates the color separation values of the frame lines. As for the primary point C in the color separation table of medium B, assume that the total colorant amount is 180% in the color separation table of medium A, and the total colorant amount calculated for medium B in step S606 is 200%. In this case, the total colorant amount at point C in the color separation table of medium A is increased by 20% to 200%. Along with this, all the C values of a frame line (in this case, one of Bk-C, W-C, C-B, and C-G) set in step S605 are linearly increased by 20%, and the resultant values are set as the values of the frame line in the color separation table of medium B.

In step S608, the ink color separation table creation unit 104 determines the nonlinear correction coefficient strengths of the respective colors in accordance with the priority of evaluation items set in step S603. The nonlinear correction coefficient strengths are values used to perform nonlinear correction for the respective ink colors, that is, a main color (C, M, Y, and K), a light color (Lc, Lm, Lk1, and Lk2), and an adjacent color (R, G, and B), and are represented by E1, E2, and E3. For example, when "graininess priority" is set as the evaluation item, the nonlinear correction coefficient strengths are set to E1=1, E2=3, and E3=1 in order to effectively use the light color ink. For example, when "color gamut priority" is set as the evaluation item, the nonlinear correction coefficient strengths are set to E1=3, E2=1, and E3=2 in order to effectively use the main color ink.

In step S609, the ink color separation table creation unit 104 executes correction using the nonlinear correction coefficient strength E1 of the main color. In step S610, the ink color separation table creation unit 104 executes correction using the nonlinear correction coefficient strength E2 of the light color. In step S611, the ink color separation table creation unit 104 executes correction using the nonlinear correction coefficient strength E3 of the adjacent color. Correction of ink color data using the nonlinear correction coefficient strengths E1, E2, and E3 in the first embodiment can employ a known correction method using parameters capable of nonlinear correction.

In step S612, the ink color separation table creation unit 104 determines whether the sum of ink amounts at grid points on the frame line in process has reached a value represented by the total colorant amount restriction information. A variety of methods are conceivable as the determination method. For example, considering a strength update method in step S613 (to be described later), it suffices to determine whether the sum of ink amounts as a result of the current correction is a maximum value smaller than the value represented by the total colorant amount restriction information.

If the sum of values on the frame line has not reached the value represented by the total colorant amount restriction information, that is, there is room for correction, the ink color separation table creation unit 104 updates the nonlinear correction coefficient strengths E1, E2, and E3 to increase them in step S613. Then, the ink color separation table creation unit 104 performs correction in steps S609 to S611 again. As the nonlinear correction coefficient strength update method in step S613, for example, each coefficient strength is incremented by one. However, the present invention is not limited to this example. By the determination loop in step S612, all values on the frame line are controlled to come close to the total colorant amount restriction information as much as possible. As a result, the color separation table of medium B can be created to implement a set total colorant amount at maximum.

In step S614, the ink color separation table creation unit 104 determines whether all the 19 frame lines in the color separation table of medium B have been processed. If an unprocessed frame line remains, the ink color separation table creation unit 104 returns to step S605 to process the next frame line.

(Optimization of Frame Line of Color Separation Table)

Figure 7:
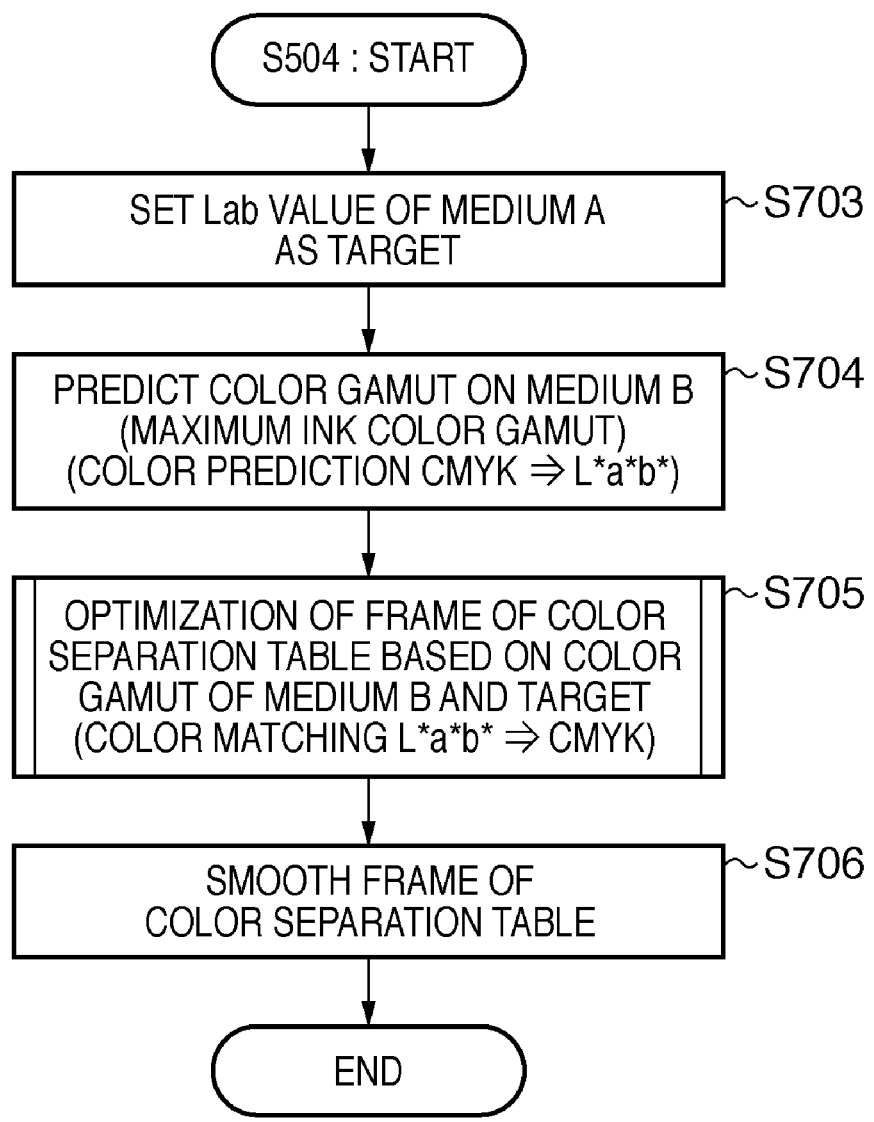
FIG. 7 is a flowchart showing a color separation table optimization process by color prediction in an embodiment.

The color separation table optimization process using color prediction in step S504 of FIG. 5 will be described in detail with reference to the flowchart of FIG. 7.

The color separation table generated in step S503 before optimization strictly observes the total colorant amount on medium B, but does not consider a tint actually expressed by a corrected ink combination. If printing is done directly using this color separation table, color mis-registration or a pseudo-contour may be generated. To suppress the generation of color mis-registration or a pseudo-contour, the first embodiment executes the following optimization process.

In step S703, the ink color separation table creation unit 104 calculates the Lab value of medium A by color prediction process such as cellular Neugebauer, and sets the Lab value as a target. More specifically, the ink color separation table creation unit 104 obtains C, M, Y, and K values at which the color gamut is a maximum for medium A, and converts them into L, a, and b values. This process is based on a color reproducibility table which holds the L, a, and b values at the primaries of medium A.

In step S704, the ink color separation table creation unit 104 predicts a color gamut on medium B. More specifically, the ink color separation table creation unit 104 obtains C, M, Y, and K values at which the color gamut is a maximum for medium B, and converts them into L, a, and b values. This process is based on a color reproducibility table which holds the L, a, and b values at the primaries of medium B.

Note that the process order of steps S703 and S704 may also be reversed.

In the first embodiment, color reproducibility tables corresponding to respective media are looked up in the above-described steps S703 and S704. A creation process to properly create the color reproducibility tables will be described later.

In step S705, the ink color separation table creation unit 104 compares the Lab value of the maximum color gamut of medium B that has been predicted in step S704 with the Lab value of the target that has been calculated in step S703. The ink color separation table creation unit 104 reflects the comparison result to optimize frame lines in the color separation table. Details of the optimization method will be described later. Since the optimization is done based on the Lab value, C, M, Y, and K values corresponding to the optimization result are obtained by a known search method.

In step S706, the ink color separation table creation unit 104 smoothes the frame lines of the color separation table in order to further improve tonality. More specifically, the gray tone on the Bk-W gray line is held. As for the remaining color colorants, the tone change is smoothed into a hill-like shape made up of monotonic increase and monotonic decrease, excluding singularities. This smoothing process smoothly connects the frame lines.

(Color Separation Table Frame Optimization Process)

Figure 8:
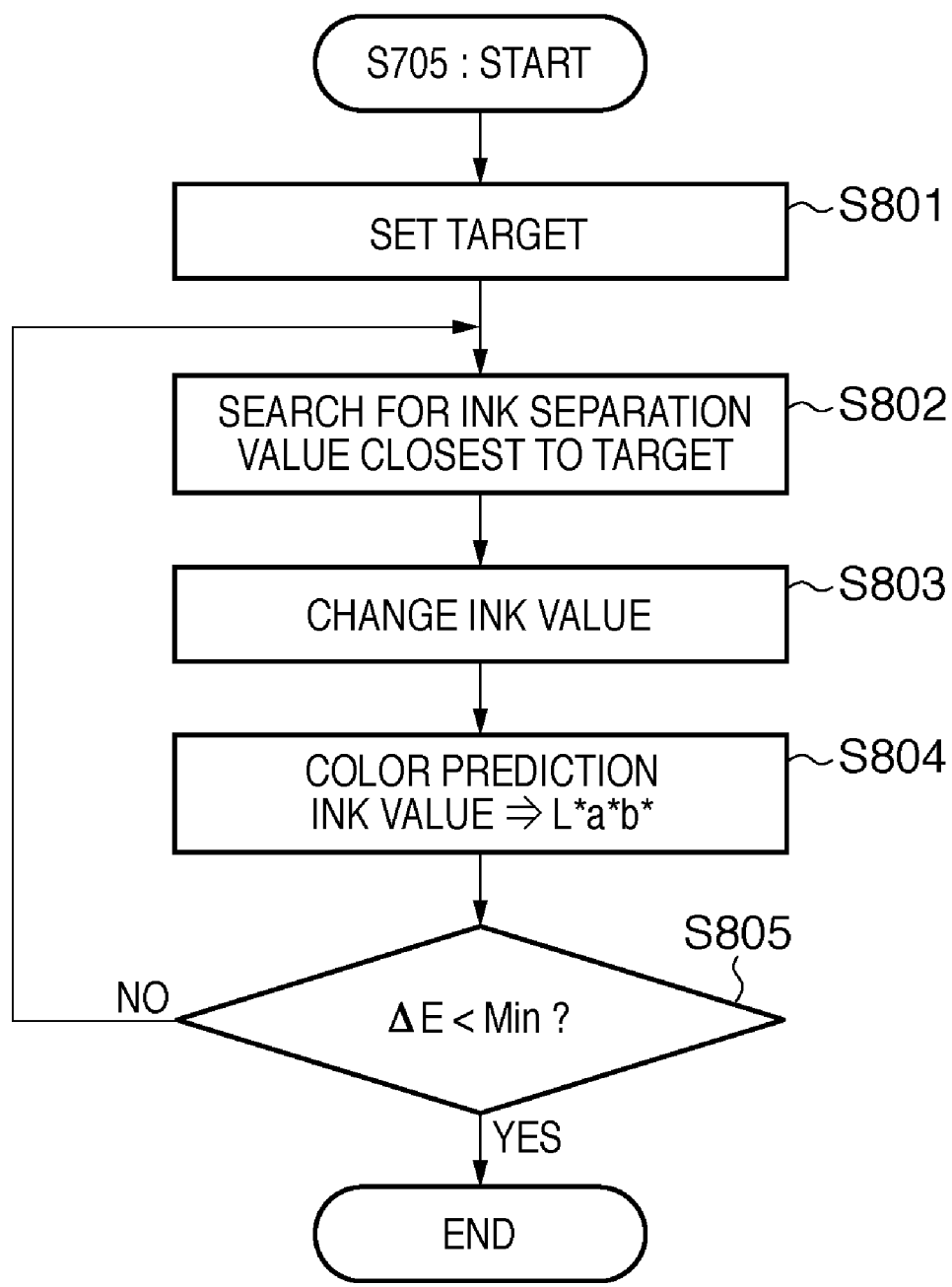
FIG. 8 is a flowchart showing a color separation table frame line optimization process in an embodiment.

The color separation table frame line optimization process in step S705 of FIG. 7 will be explained in detail with reference to the flowchart of FIG. 8.

In step S801, the ink color separation table creation unit 104 obtains the initial value of the color separation table of medium B to be optimized, and the target Lab value of medium A. In step S802, the ink color separation table creation unit 104 obtains, from the color reproducibility table of medium B, the ink color separation value of a primary which attains a Lab value closest to the target Lab value.

In step S803, the ink color separation table creation unit 104 corrects an ink color separation value in the color separation table of medium B based on the color separation value obtained in step S802. More specifically, the value of a grid point in the color separation table that corresponds to the obtained ink color separation value of the primary is changed into the ink color separation value of the primary to interpolate a frame line having the grid point.

In step S804, the ink color separation table creation unit 104 converts an ink color separation value based on color prediction from each grid point into an Lab value for the color separation table changed in step S803.

In step S805, the ink color separation table creation unit 104 compares the Lab value obtained in step S804 with the target Lab value. If the difference ΔE is greater than or equal to a predetermined value Min, the ink color separation table creation unit 104 returns to step S802 to repeat the search for obtaining an ink color separation value. In this manner, the search and the correction of an ink color separation value are repeated until ΔE becomes smaller than Min, thereby optimizing grid point data of the color separation table corresponding to the target.

By executing this process for all target Lab values, the color separation table of medium B is optimized.

(Color Separation Table Adjustment UI)

In general, when creating color separation tables corresponding to color inks of a plurality of colors, the color gamut can be widened by, for example, a combination of inks, but the tonality is impaired. The color separation table has a trade-off relationship between evaluation items (in this case, the color gamut and tonality). The user preferably determines which evaluation item is given priority to create a color separation table.

As described above, when the illuminant which illuminates a formed image changes, the color gamut may not be effectively output or the tonality may suffer in an automatically generated color separation table. Thus, the color separation table is preferably created for each illuminant.

For this reason, the first embodiment allows the user to arbitrarily adjust, via a user interface (UI), a color separation table automatically generated for medium B in the above-described way. Further, the color separation table is optimized in accordance with a change of the illuminant.

Figure 9:
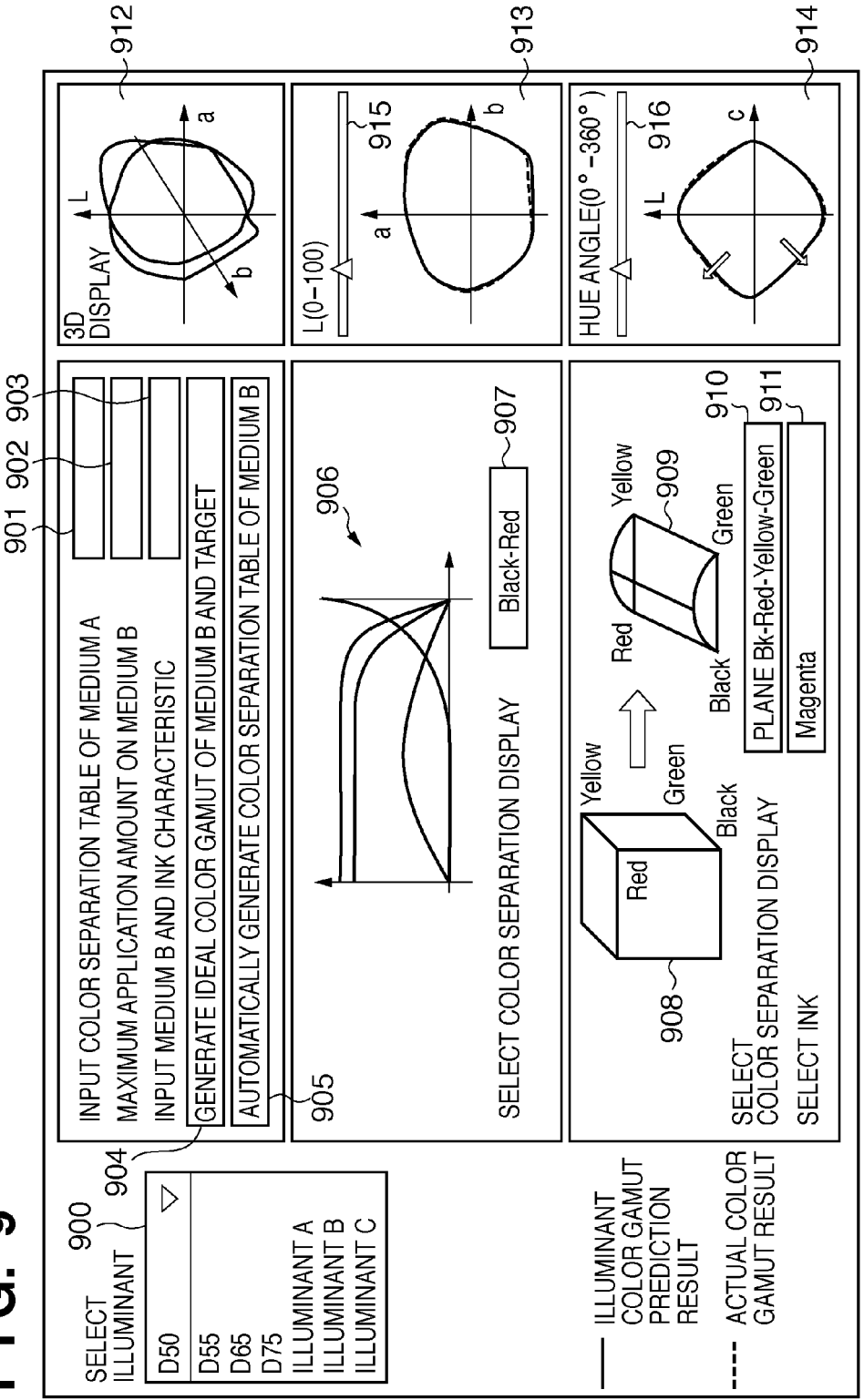
FIG. 9 is a view showing an example of a color separation table adjustment user interface (UI) in an embodiment.

FIG. 9 is a view showing an example of a color separation table adjustment UI in the first embodiment. In FIG. 9, a box 900 is used to select an illuminant. A box 901 is used to input the color separation table of medium A. A box 902 is used to input total colorant amount restriction information of medium B. A box 903 is used to input the ink characteristic of medium B to be adjusted. The ink characteristic is the color reproducibility table of medium B, which is created based on the color measurement values of tone patches of a single color and those of mixed color patches of all color inks.

A button 904 is used to designate execution of generating an ideal color gamut of medium B and the above-mentioned target Lab value of medium A. A button 905 is used to designate execution of automatically generating the color separation table of medium B. By sequentially pressing the buttons 904 and 905, a color separation table for medium B is automatically generated by the above-described method.

A box 907 is used to select a frame line for which color separation data in the color separation table of medium B are displayed. A color separation table display portion 906 displays color separation data of a frame line (Bk-R in the example of FIG. 9) selected in the box 907. The user can adjust color separation data displayed at the color separation table display portion 906 by using an input unit (not shown).

A box 910 is used to select a display plane for which color separation in the RGB space is displayed. A box 911 is used to select an ink color to be displayed. A plane selected in the box 910 is clearly indicated at a display portion 908, and the separation amount distribution of an ink color selected in the box 911 from the selected plane is displayed at a display portion 909. The user can adjust the color separation amount distribution displayed at the display portion 909 by using an input unit (not shown).

A 3D display 912 shows, in the 3D Lab space, the color separation table data of medium B generated by pressing the buttons 904 and 905.

An a-b plane display 913 is extracted from the 3D display 912. The L value is set with a bar 915, and the a-b plane display 913 represents an a-b plane which is a section cut at the L value. On the a-b plane display 913, the solid line represents an ideal color gamut as a color gamut prediction result which is generated by pressing the button 904 and considers the illuminant. The dotted line represents an actual color gamut based on a color separation table generated by pressing the button 905.

An L-c plane display 914 corresponds to a hue angle h set with a bar 916 in the Lch space. Similar to the a-b plane display 913, the solid line represents an ideal color gamut, and the dotted line represents an actual color gamut based on the color separation table. In the first embodiment, the user can adjust the color gamut of the color separation table on the L-c plane display 914 by using an input unit (not shown), while referring to the 3D display 912, a-b plane display 913, and L-c plane display 914. The adjustment result is quickly reflected and displayed on the a-b plane display 913 and the 3D display 912 in the Lab space. Note that FIG. 9 shows an example in which the user adjusts to widen the color gamut. Along with this adjustment, the color gamut of the color separation table on the a-b plane display 913 also comes close to an ideal color gamut.

In the first embodiment, image forming characteristics such as an ideal color gamut corresponding to an illuminant are displayed based on the automatically generated color separation table of medium B. If the user, who has checked displayed characteristics such as the ideal color gamut, inputs an instruction, the color separation table can be arbitrarily adjusted in accordance with the user instruction.

(Color Reproducibility Table Creation Process)

A process to create a color reproducibility table held for each medium in the first embodiment will be explained with reference to the flowchart of FIG. 10. The color reproducibility table in the first embodiment includes the color measurement values of tone patches representing the tonality of a single ink color on a medium, and those of mixed color patches of all color inks, and holds information on a reproducible color gamut.

In step S1001, parameters are input. The parameters are data such as total colorant amount restriction information of medium B, and the number and pitch of grids in an ink color space. In step S1002, after all primaries are generated, patches are generated for only primaries which are printable because the total colorant amount falls within the total colorant amount restriction. Details of the patch generation process will be described later. In step S1003, the patches generated in step S1002 are printed to measure the color.

In step S1004, it is self-checked whether the printed primary patches are appropriate.

In step S1005, the self-check result of step S1004 is determined. That is, if it is determined that the primary patches are not appropriate, an error message is displayed in step S1006 to notify the user of the message to this effect. Then, the process returns to step S1001 to input parameters again.

If it is determined in step S1005 that the verification result is OK, that is, that primary patches are appropriate, the process advances to step S1007 to input the color measurement result from step S1003. In step S1008, the spectral values of primaries which are unprintable because the total colorant amount exceeds the total colorant amount restriction are estimated using the color measurement values. As a result, the color measurement values, that is, spectral values at all primaries or grid points can be obtained, completing a color reproducibility table.

In the first embodiment, the created color reproducibility table enables color prediction at an arbitrary point in a color space including primaries. More specifically, when the signal value of a point subjected to prediction is input, the spectral value of the point can be output by executing color prediction using, for example, a known cellular Neugebauer process based on the color measurement values of primaries around the point in the color reproducibility table.

(Patch Generation Process)

Figure 11:
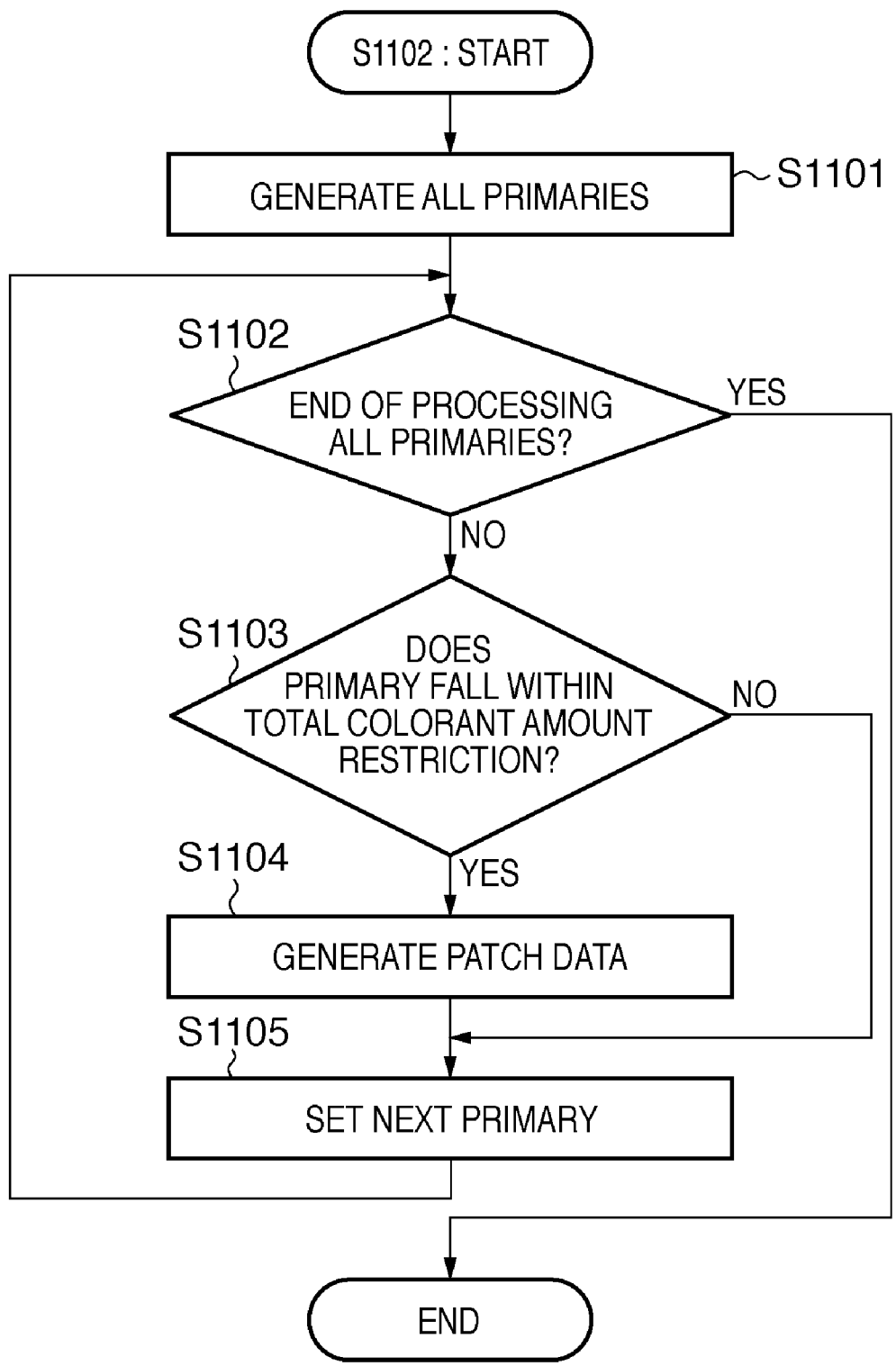
FIG. 11 is a flowchart showing a primary patch generation process in an embodiment.

Details of the primary patch generation process in step S1002 will be explained with reference to the flowchart of FIG. 11.

In step S1101, all primaries are generated to equally divide a colorant color space based on parameters such as the number of colorants and the number of grids that have been input in step S1001. In step S1102, it is determined whether the patch generation process has ended for all primaries. If the patch generation process has not ended, the process advances to step S1103. In step S1103, it is determined whether the primary to be processed falls within the total colorant amount restriction. If the primary falls within the total colorant amount restriction, the patch data is created in step S1104, and the process advances to step S1105. If the primary does not fall within the total colorant amount restriction, the process directly advances to step S1105.

In step S1105, a counter is incremented, and the process returns to step S1102 to perform the patch generation process for the next primary.

If it is determined in step S1102 that all primaries have been processed, the process ends. As a result, patch data are generated for only those primaries falling within the total colorant amount restriction out of all the primaries. The generated patch data will be referred to as a primary patch.

(Verification Patch)

The first embodiment performs a self-check using a verification patch in order to verify whether a primary patch created in the above-described way has been printed accurately. The verification patch in the first embodiment will now be described.

Figure 12:
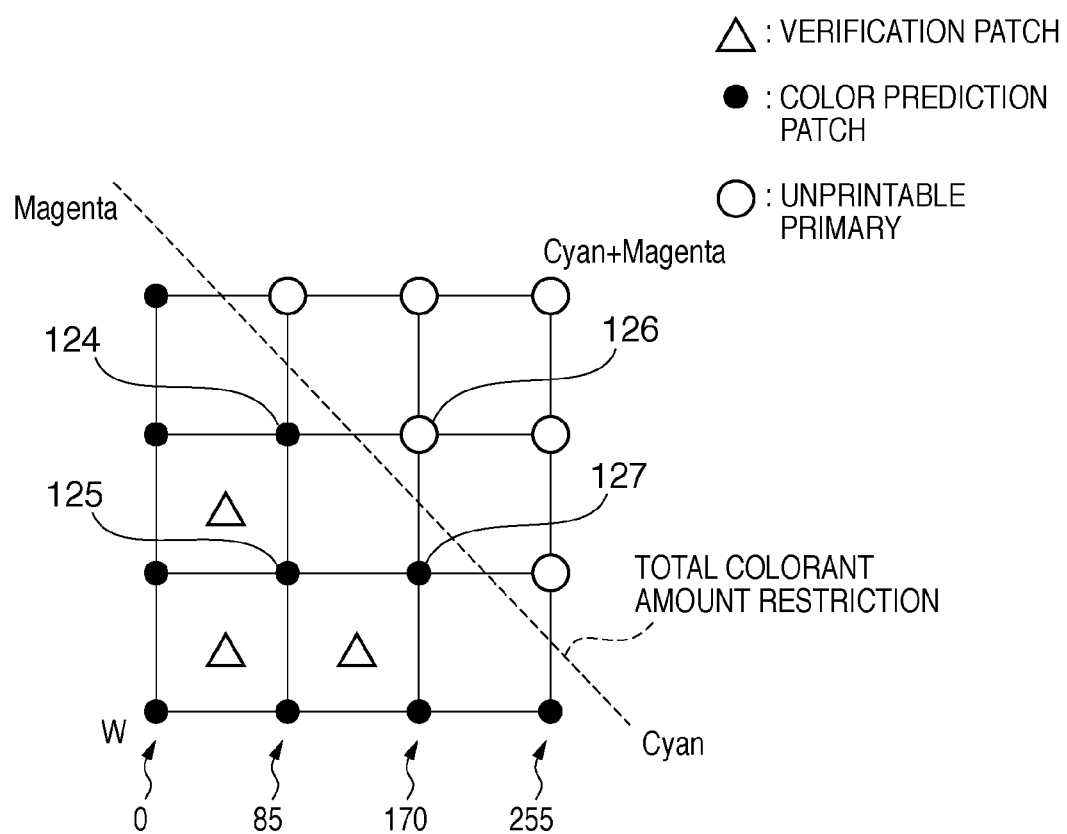
FIG. 12 is a view showing an example of a primary patch and verification patch in an embodiment.

FIG. 12 is a view showing an example of a primary patch and verification patch referred to when a secondary color of cyan and magenta is used. In FIG. 12, frame lines between four points W, C, M, and C+M are divided by the number of grids to obtain primaries. In this example, each frame line is equally divided into three at points 0, 85, 170, and 255. In FIG. 12, attention is given to four primaries 124, 125, 126, and 127. The primaries 124, 125, and 127 fall within the total colorant amount restriction indicated by a dotted line, whereas the primary 126 falls outside the total colorant amount restriction. That is, in FIG. 12, the symbol ● represents a printable primary falling within the total colorant amount restriction, and each printable primary is printed as a primary patch to measure the color. The symbol ○ represents an unprintable primary exceeding the total colorant amount restriction. In the first embodiment, an appropriate spectral value is estimated for an unprintable primary by a color prediction process based on primary patches indicated by the symbol ● falling within the total colorant amount restriction.

A color prediction equation to calculate the spectral reflectance R at an arbitrary point within a region defined by the four primaries 124, 125, 126, and 127 is as follows. Note that F represents color development characteristic data of each colorant, and P represents the area ratio of each colorant.

$$R = F \times P$$

When obtaining the color development characteristics of some primaries, this color prediction equation is rewritten as $$F = R \times P^{-1}$$

Based on this equation, the first embodiment uses, as a verification patch, a region between grid points in a color space, that is, a region (verification region) defined by printable primaries indicated by the symbol ● in FIG. 12. In FIG. 12, the symbol Δ represents an example of the verification patch. In the first embodiment, it is verified based on the color prediction result of a verification patch whether four primary patches around the verification patch have properly been printed. The verification patch in the first embodiment is premised on the fact that all the four surrounding primary patches are printed within the total colorant amount restriction in order to perform color prediction based on four surrounding primary patches in the self-check process (to be described later). In the example of FIG. 12, three regions, for each of which all four surrounding primaries (to be referred to as peripheral primaries hereinafter) are represented by the symbol ●, are actually available as verification patches.

(Primary Patch Self-Check Process)

Figure 10:
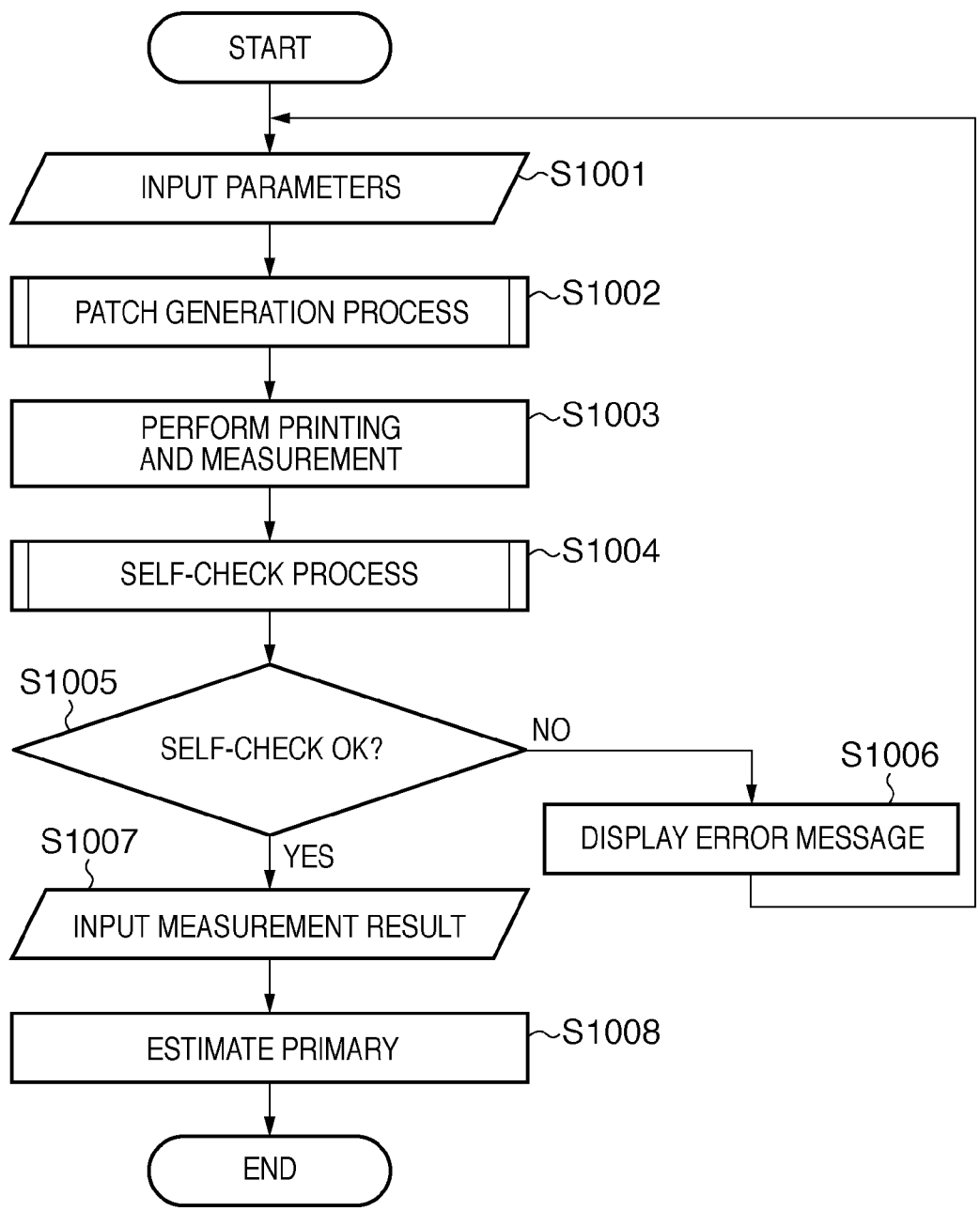
FIG. 10 is a flowchart showing a color reproducibility table creation process in an embodiment.
Figure 13:
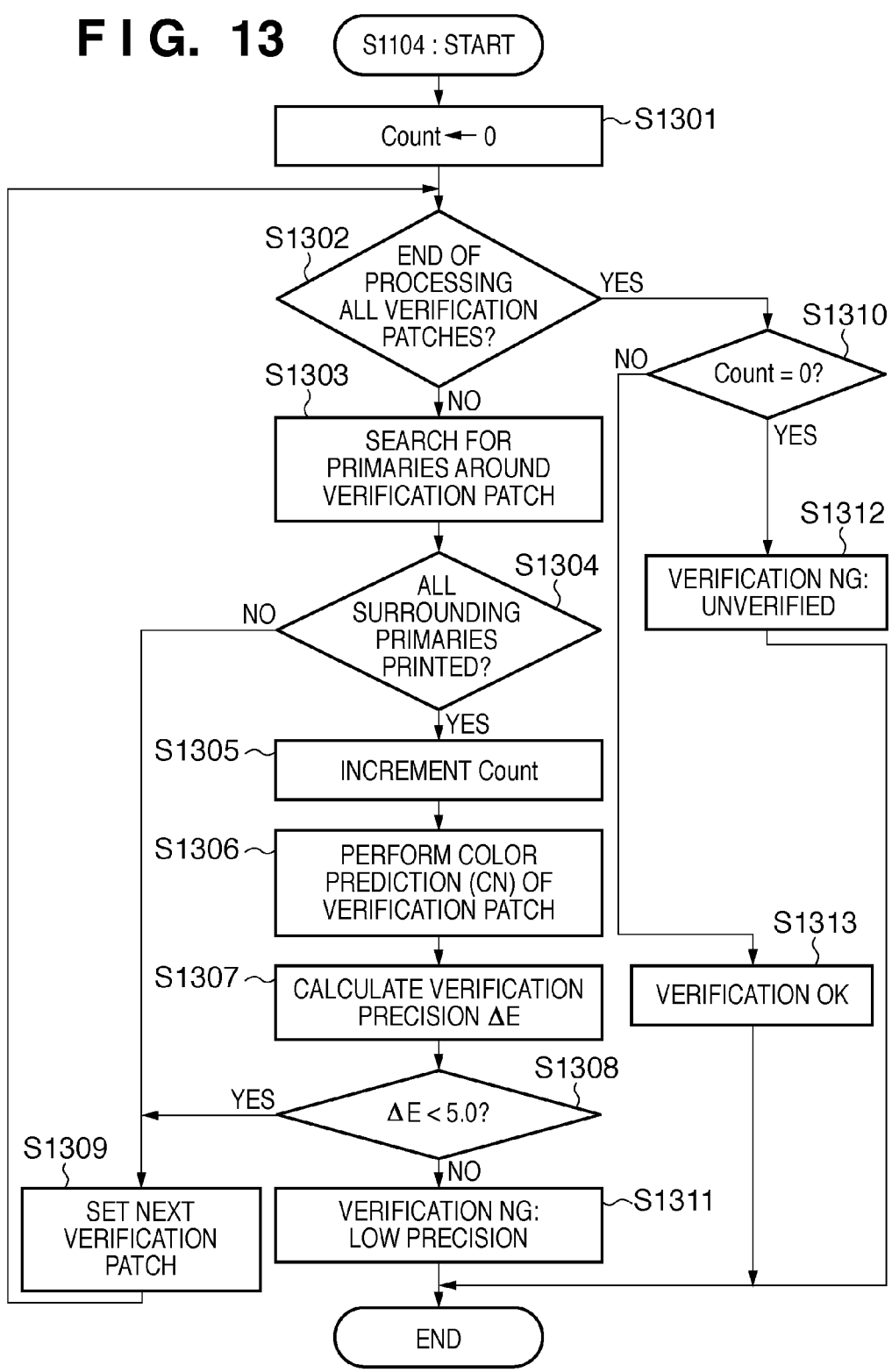
FIG. 13 is a flowchart showing a primary patch self-check process in an embodiment.
Figure 14:
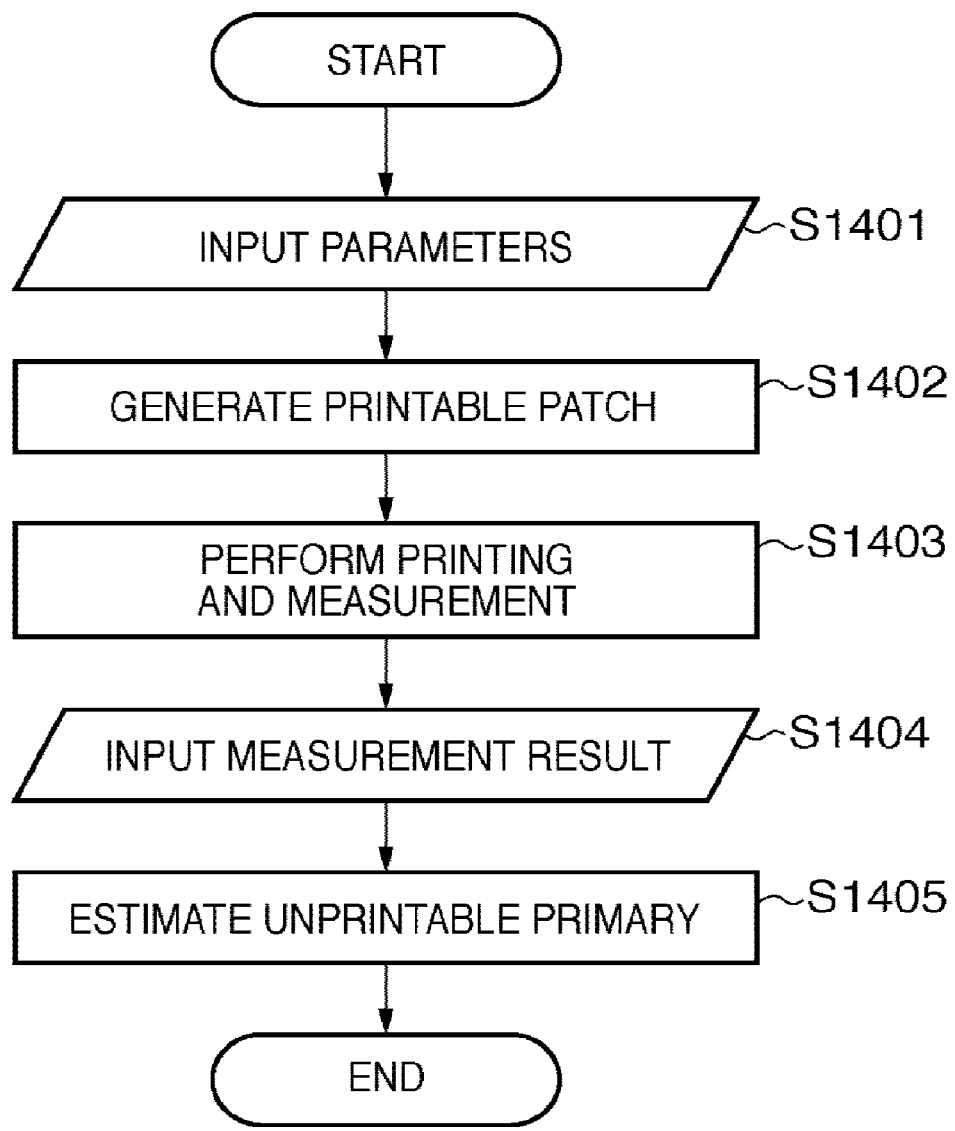
FIG. 14 is a flowchart showing a conventional color reproducibility table creation process.
Figure 15:
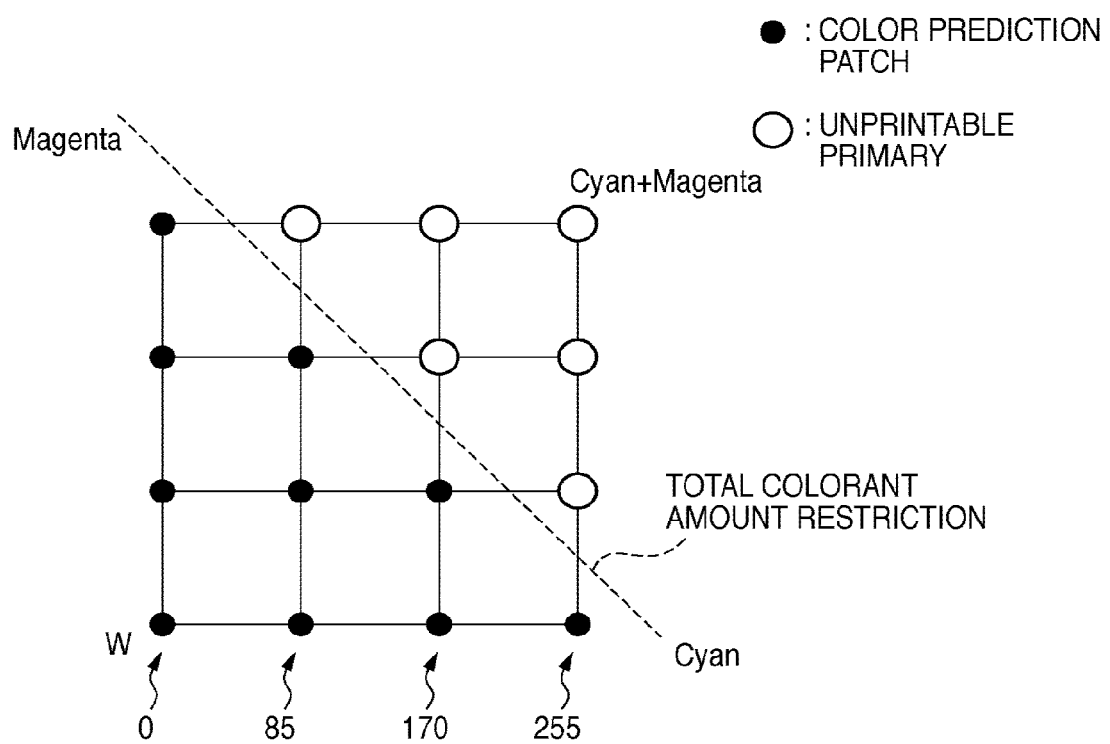
FIG. 15 is a view showing an example of a conventional primary patch.

FIG. 13 is a flowchart showing details of the self-check process in step S1004 of FIG. 10. As described above, the self-check process in the first embodiment determines whether a primary patch has been printed properly. For this purpose, the self-check process uses a verification patch.

In step S1301, a parameter Count representing the number of verification patches for which the verification result is OK is initialized to 0. Further, the total number of regions (total number of patches) settable as verification patches is set. For example, in FIG. 12, all the settable patches are nine regions defined by primaries, and whether each primary is printable is not considered. Each verification patch undergoes the following processes in steps S1302 to S1308. A counting process for each verification patch is not described.

In step S1302, it is determined based on the total number of patches whether all verification patches have been processed. If all verification patches have been processed, the process advances to step S1310. If not all verification patches have been processed, the process advances to step S1303.

In step S1303, peripheral primaries around a verification patch to be processed are searched for. In step S1304, it is determined whether all the patches of the peripheral primaries have been printed. If even one of the peripheral primaries has not been printed, the current verification patch cannot be used for verification. Thus, the next verification patch is set in step S1309, and the process returns to step S1302.

If it is determined in step S1304 that all the patches of the peripheral primaries of the verification patch have been printed, the verification patch can be used for verification, and the process advances to step S1305 to increment Count. In step S1306, the color prediction value, that is, the corresponding Lab value (actual measurement Lab value) of the verification patch, is obtained by a known cellular Neugebauer process, based on the actual measurement values of the peripheral primary patches.

In step S1307, the verification precision $\Delta E$ is calculated as the difference between the actual measurement Lab value of the verification patch that has been predicted in step S1306, and a corresponding theoretical Lab value is also calculated. The theoretical Lab value of the verification patch that is referred to in precision calculation can be calculated based on the theoretical values of the peripheral primary patches. The theoretical Lab value of the verification patch may also be calculated and held in advance when, for example, generating all primaries.

In step S1308, $\Delta E$ is compared with a predetermined threshold value (e.g., 5.0). If $\Delta E$ is smaller than the predetermined threshold, the verification precision of the verification patch is regarded to be sufficiently high. Then, the process advances to step S1309 to process the next verification patch. If $\Delta E$ is greater than or equal to the predetermined threshold, the theoretical Lab value and actual measurement Lab value of the verification patch are not close to each other, that is, the verification precision is regarded to be low. In step S1311, NG (meaning no good) is set as the verification result, and an error message to this effect is set. Then, the process ends.

In step S1310, it is determined whether Count is 0, that is, whether at least one verification patch has fully been verified. If Count is 0, it is determined that the verification by the verification patch has failed. The process advances to step S1312 to set NG as the verification result and set an error message to this effect. Then, the process ends.

If Count is not 0 in step S1310, the verification has successfully ended. The process advances to step S1313 to set OK as the verification result, and ends.

As described above, according to the color processing method of the first embodiment, when creating a color reproducibility table for each medium, the color measurement value of a printable primary patch is self-checked to estimate an unprintable primary. Optimal color measurement values can, therefore, be obtained for all primaries in the color reproducibility table. By executing color prediction using the color reproducibility table, an optimal color separation table can be created.

For example, when automatically creating the second color separation table optimal for the second medium by using the first existing color separation table for the first medium, the second color separation table can be optimized by color prediction based on the first color reproducibility information and second color reproducibility information (color reproducibility tables).

Second Embodiment

The above-described color prediction process looks up a color reproducibility table which defines the spectral value of each primary for a medium for use. The color reproducibility table looked up in the color prediction process will be explained with reference to FIGS. 22 and 23.

Figure 22:
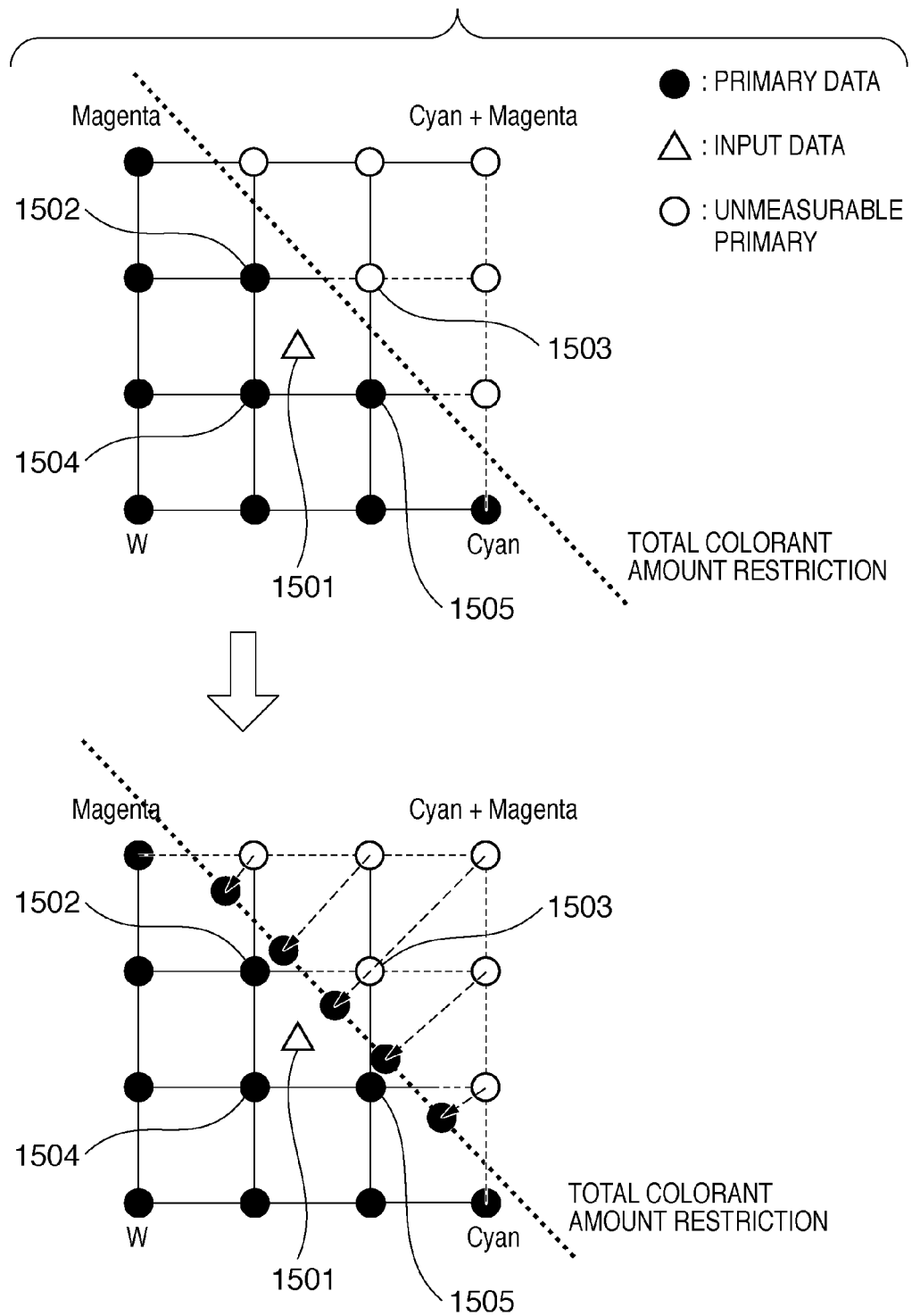
FIG. 22 is a view showing an example of a conventional primary patch.

FIG. 22 is a view showing an example of printable and unprintable primaries when two inks, cyan (C) and magenta (M), are used. In FIG. 22, frame lines between four points W (White), C, M, and C+M are divided by the number of grids (three in this example), to obtain primaries. On the upper part of FIG. 22, the symbol ● represents a printable primary falling within the total colorant amount restriction indicated by a dotted line, and each printable primary is formed as a color prediction patch. The symbol ○ represents an unprintable (i.e., unmeasurable) primary exceeding the total colorant amount restriction. When a point 1501 is given as a color prediction target, calculation (color prediction) of spectral data corresponding to the colorant amount for use is done based on primaries 1502, 1503, 1504, and 1505 at four closest points surrounding the point 1501. On the upper stage of FIG. 22, the primaries 1502, 1504, and 1505 out of these four points fall within the total colorant amount restriction, and the primary 1503 falls outside the total colorant amount restriction.

According to a conventional method, the primary 1503 falling outside the total colorant amount restriction is linearly corrected to fall within the total colorant amount restriction, as shown in the lower part of FIG. 22. By using the corrected primary, a color prediction patch is formed to create a color reproducibility table.

FIG. 23 is a flowchart showing a conventional color prediction patch data creation process. In step S1601, the number of colorants and the number of grids are input. In step S1602, the colorant space is equally divided to create color prediction primaries and their patch data. In step S1603, the patch data of a color prediction primary is corrected to fall within the total colorant amount restriction. In step S1604, all color prediction patch data including the corrected patch data are printed and measured.

However, the color reproducibility table creation process suffers the following problems. When a primary is linearly corrected in accordance with the total colorant amount restriction, the linear relationship with peripheral primaries is lost, decreasing the color predictability. In addition, if the number of colorants for use increases, the number of primaries and the printing load also increase.

To prevent this, the second embodiment implements high-precision color prediction which suppresses the prediction patch printing load even if the number of colorants for use increases when simulating the color reproducibility of mixed colorants by color prediction.

Similar to the first embodiment, the second embodiment allows the user to arbitrarily adjust, via a UI, a color separation table automatically generated for medium B in the above-described way. The color separation table can also be optimized in accordance with a change of the illuminant.

Figure 16:
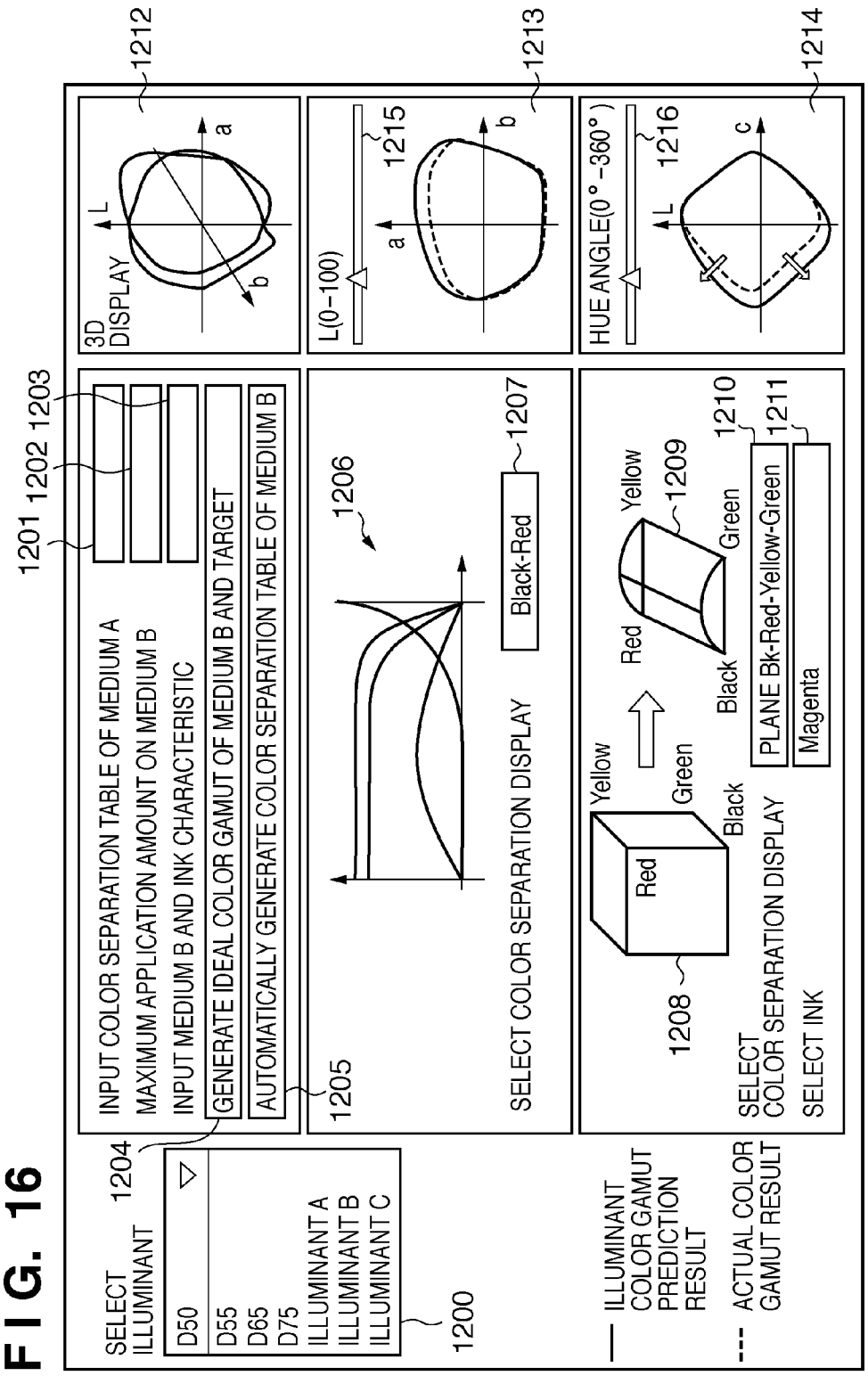
FIG. 16 is a view showing an example of a color separation table adjustment UI in an embodiment.

FIG. 16 is a view showing an example of a color separation table adjustment UI in the second embodiment. In FIG. 16, a box 1200 is used to select an illuminant. A box 1201 is used to input the color separation table of medium A. A box 1202 is used to input ink application amount restriction information of medium B. A box 1203 is used to input the ink characteristic of color prediction medium B. In this case, characteristic data of the ink and medium are tone patches of a single color and mixed color patches of all color inks.

A button 1204 is used to designate execution of generating an ideal color gamut of medium B and a target value based on ink characteristic data of medium A. A button 1205 is used to designate execution of automatically generating the color separation table of medium B. By sequentially pressing the buttons 1204 and 1205, a color separation table for medium B is automatically generated by the above-described method.

A box 1207 is used to select a frame line for which color separation data in the color separation table of medium B are displayed. A color separation table display portion 1206 displays color separation data of a frame line (Bk-R in the example of FIG. 16) selected in the box 1207. The user can adjust color separation data displayed at the color separation table display portion 1206 by using an input unit (not shown).

A box 1210 is used to select a color separation display plane in the RGB space. A box 1211 is used to select an ink color to be displayed. A plane selected in the box 1210 is clearly indicated at a display portion 1208, and the separation amount distribution of an ink color selected in the box 1211 from the selected plane is displayed at a display portion 1209. The user can adjust the color separation display plane displayed at the display portion 1209 by using an input unit (not shown).

A 3D display 1212 shows, in the 3D Lab space, color separation table data of medium B generated by pressing the buttons 1204 and 1205.

An a-b plane display 1213 is extracted from the 3D display 1212. The L value is set with a bar 1215, and the a-b plane display 1213 represents an a-b plane which is a section cut at the L value. On the a-b plane display 1213, the solid line represents an ideal color gamut as a color gamut prediction result which is generated by pressing the button 1204 and considers the illuminant. The dotted line represents an actual color gamut based on a color separation table generated by pressing the button 1205.

An L-c plane display 1214 corresponds to a hue angle h set with a bar 1216 in the Lch space. Similar to the a-b plane display 1213, the dotted line represents an ideal color gamut, and the solid line represents an actual color gamut based on the color separation table. In the second embodiment, the user can adjust the color gamut of the color separation table on the L-c plane display 1214 by using an input unit (not shown), while referring to the 3D display 1212, a-b plane display 1213, and L-c plane display 1214. The adjustment result is quickly reflected and displayed on the a-b plane display 1213 and the 3D display 1212 in the Lab space.

Figure 17:
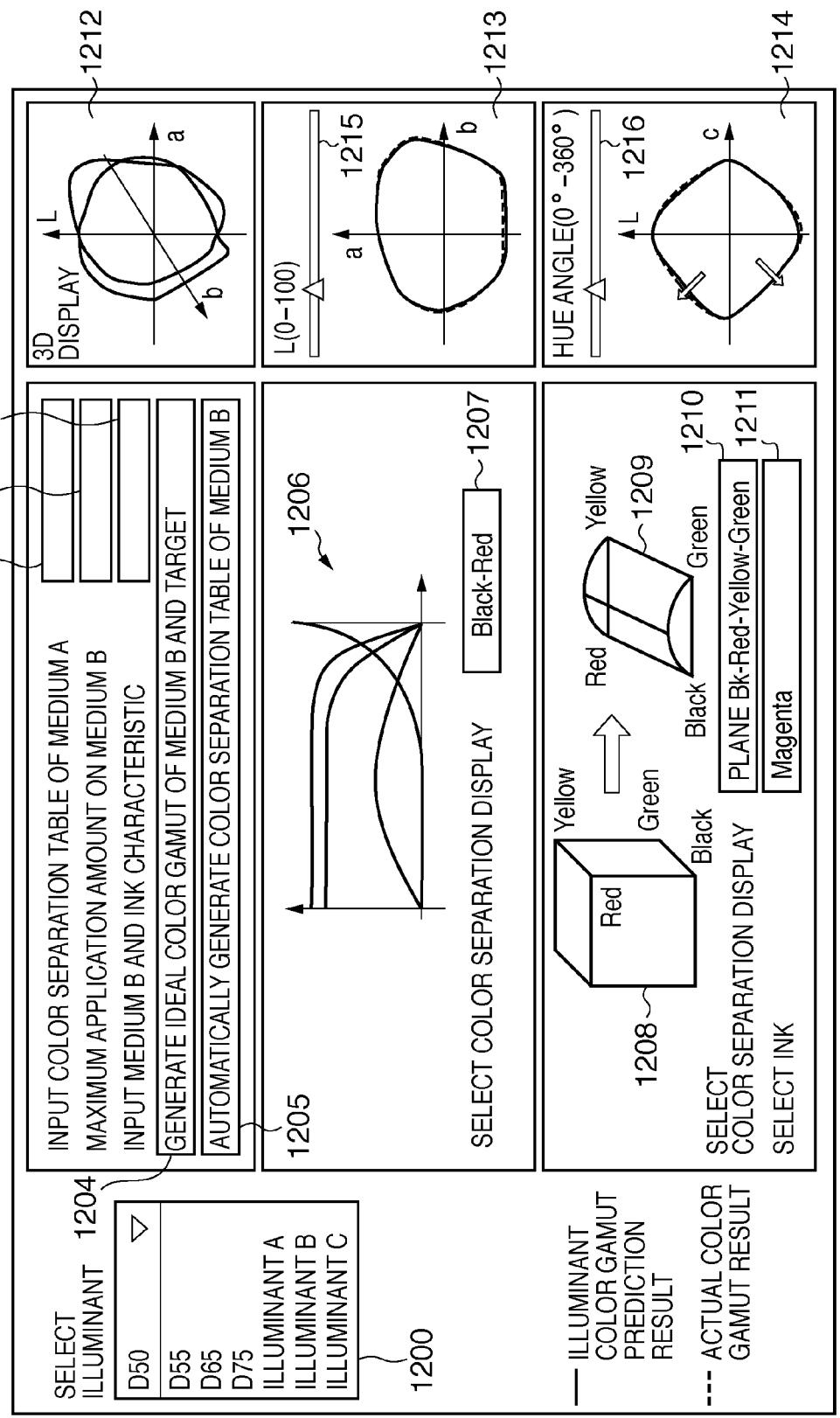
FIG. 17 is a view showing an example of the color separation table adjustment UI in an embodiment.

FIG. 17 shows a display example after the user adjusts the color gamut of the color separation table on the L-c plane display 1214 in the UI shown in FIG. 16. In FIG. 17, the actual color gamut of the color separation table represented by the dotted line on the L-c plane display 1214 is adjusted to come close to the ideal color gamut represented by the solid line. Along with this, the color gamut of the color separation table on the a-b plane display 1213 also comes close to the ideal color gamut. In other words, the user has adjusted to widen the color gamut.

In the second embodiment, image forming characteristics such as an ideal color gamut corresponding to an illuminant are displayed based on the automatically generated color separation table of medium B. If the user, who has checked displayed characteristics such as the ideal color gamut, inputs an instruction, the color separation table can be arbitrarily adjusted in accordance with the user instruction.

(Color Reproducibility Table Creation Process (Primary Estimation by Color Prediction))

A process to create a color reproducibility table held for each medium in the second embodiment will be explained with reference to FIGS. 18 and 19.

FIG. 18 is a view showing an example of patch data (primary) used for color prediction in the color reproducibility table creation process in the second embodiment when two color inks, C and M, are used. In FIG. 18, frame lines between four points W, C, M, and C+M are divided by the number of grids (three in this example) to obtain primaries. In FIG. 18, the symbol ● represents a printable primary falling within the total colorant amount restriction indicated by a dotted line, and each printable primary is formed as a color prediction patch. The symbol ◆ represents a primary which exceeds the total colorant amount restriction and thus is estimated in the second embodiment. When a point 1101 is given as a color prediction target, calculation (color prediction) of spectral data corresponding to the colorant amount for use is done based on primaries 1102, 1103, 1104, and 1105 at four closest points surrounding the point 1101. In FIG. 18, the primaries 1102, 1104, and 1105 out of these four points fall within the total colorant amount restriction, so patches are actually printed to measure the color. The primary 1103 falls outside the total colorant amount restriction, but appropriate spectral data is estimated based on the measurement values of the three remaining points. Hence, the second embodiment can perform color prediction of the point 1101 by nonlinear conversion based on the measurement values of other primaries and an estimated value, without performing linear correction to make a primary falling outside the total colorant amount restriction fall within it.

In the second embodiment, spectral data of a primary which is unprintable because the primary falls outside the total colorant amount restriction is estimated as follows, based on the measurement values of primary patches falling within the total colorant use amount restriction. Letting F be color development characteristic data of each colorant, and P be the area ratio of each colorant, the color prediction equation of the spectral reflectance R at the point 1101 is given by $$R = F \times P$$

When obtaining the color development characteristics (spectral data) of some primaries, this color prediction equation is rewritten as $$F = R \times P^{-1}$$

For example, the spectral reflectance R at the point 1101 is obtained based on three points (the primaries 1102, 1104, and 1105 falling within the total colorant amount restriction) surrounding the point 1101, and the above-described equation is applied based on the spectral reflectance R.

FIG. 19 is a flowchart showing the color reproducibility table creation process in the second embodiment. The second embodiment executes primary estimation based on the above-described color prediction when creating the color reproducibility table. The color reproducibility table in the second embodiment includes the color measurement values of tone patches of a single ink color on a medium and those of mixed color patches of all color inks, and holds information on a reproducible color gamut.

In step S1201, the number of colorants and the number of grids are input. Step S1202 is a patch generation step in which the colorant space is equally divided to create color prediction primaries and their patch data. In step S1203, it is determined whether color prediction patch data falls within the total colorant amount restriction. If the color prediction patch data falls within the total colorant amount restriction, the process shifts to step S1204. Only color prediction patch data falling within the total colorant amount restriction is printed to measure the color, obtaining a color reproduction value. If it is determined in step S1203 that the color prediction patch data falls outside the total colorant amount restriction, the process shifts to step S1205. The color measurement value of the color prediction patch data falling outside the restriction is estimated in the above-described way using the color measurement value of color prediction patch data falling within the restriction. Accordingly, the color measurement values, that is, the spectral values of primaries at all grid points, can be obtained, completing a color reproducibility table.

As described above, the second embodiment estimates an unprintable primary by color prediction based on a printable primary when calculating the color development characteristics (color reproducibility table) of a colorant. While minimizing the number of printed primaries, the color predictability is increased by inhibiting linear correction to make an unprintable primary fall within the total colorant amount restriction. As a result, a preferable color reproducibility table can be created. When automatically creating the second color separation table optimal for the second medium by using the first existing color separation table for the first medium, color prediction based on the first color reproducibility information and second color reproducibility information (color reproducibility tables) can be optimized. Moreover, an interface to automate the color separation table creation process can be easily implemented.

Third Embodiment

A third embodiment according to the present invention will now be described. The third embodiment is directed to a process to create a profile appropriate for medium B by using the color separation table of medium B that is created according to the second embodiment.

FIG. 20 is a flowchart showing a profile creation process in the third embodiment. In step S2001, a color reproducibility table created by color prediction described in the second embodiment based on characteristic data of medium B, that is, characteristic data of the colorant and medium is obtained. The characteristic data of the colorant and medium are tone patches of a single color ink, and mixed color patches of all inks for use.

In step S2002, the maximum color gamut on medium B serving as a printer sheet is predicted based on the color separation table of medium B. In step S2003, target color reproduction data (Lab value) is obtained. In step S2004, a color matching profile which defines conversion from a value in the RGB space into an Lab value is created based on the target color reproduction data. In step S2005, an ink color separation profile is created based on the color matching profile.

Figure 21A:
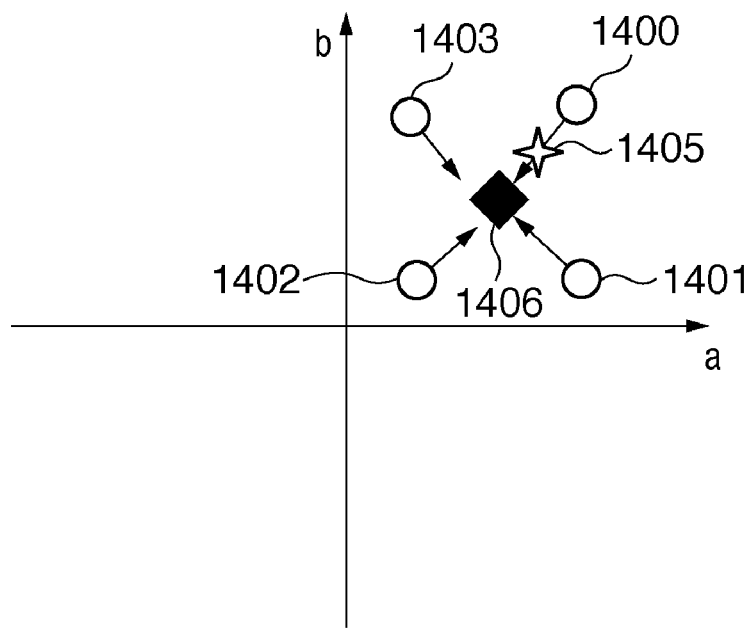
FIG. 21A is a view showing an example of color matching by conventional tetrahedral interpolation.

The benefits of the profile created in the third embodiment will be explained. According to a conventional profile creation method, after a color separation table is created, the color measurement value of the color separation table is substituted as a color matching input, and matching is executed by tetrahedral interpolation using four points close to the target value. FIG. 21A is a view showing a matching example by the conventional tetrahedral interpolation in which a skin color target 1405 is plotted on the a-b plane. A point corresponding to the target 1405 is calculated using tetrahedral interpolation. More specifically, tetrahedral interpolation is executed using four points 1400, 1401, 1402, and 1403, obtaining a point 1406 as an interpolation result. However, the point 1406 has a large color difference $\Delta E$ from the target 1405 (e.g., $\Delta E > 3$ owing to the tetrahedral interpolation precision). Since the color matching result considers only a color difference from the target, correcting the color difference impairs smoothness of an ink value change. This may generate a pseudo-contour.

According to the profile creation method described in the third embodiment, an ink separation value can be calculated directly from a target value based on a color separation table properly created by color prediction described in the second embodiment.

Figure 21B:
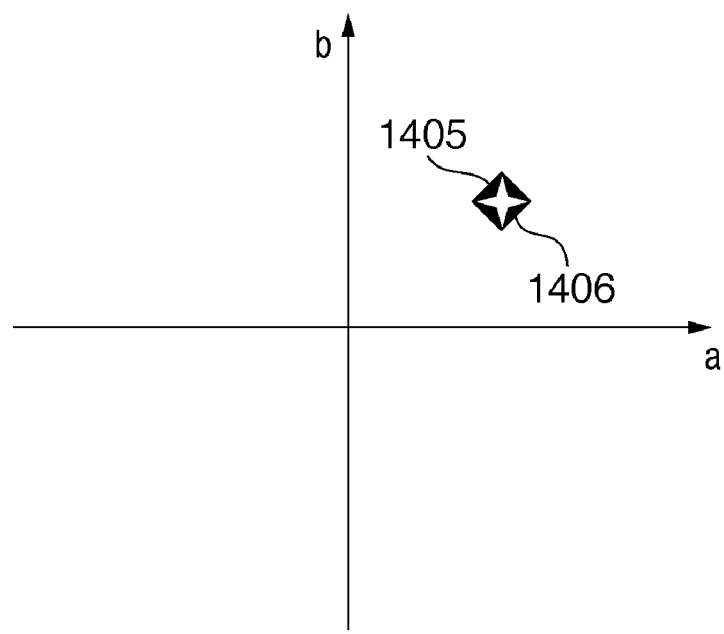
FIG. 21B is a view showing an example of color matching in the embodiment.

Therefore, the color difference $\Delta E$ from the target can be reduced (e.g., $\Delta E \leq 1$). FIG. 21B shows a matching example according to the third embodiment. The color difference between the target 1405 and the calculated point 1406 is small, and the matching precision is higher than that in the conventional matching shown in FIG. 21A.

As described above, the third embodiment can create a higher-precision color profile by using a color separation table created by color prediction described in the second embodiment.

In the first to third embodiments, the Lab space is adopted as a color space. However, another space can also be used.

The color prediction process accompanying creation of a color separation table is performed by the computer 202, but may also be executed by hardware such as a color prediction engine.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-256008, filed Sep. 28, 2007, and Japanese Patent Application No. 2007-306305, filed Nov. 27, 2007, which are hereby incorporated by reference herein in their entirety.

What is claimed is:

1. A color processing method performed by an image forming apparatus for creating a color separation table for separating image data into data of a plurality of colorants, the method comprising:
    obtaining restriction information on a total colorant amount for a medium;
    generating patches at grid points in a color space corresponding to the plurality of colorants, at which grid points the total colorant amount falls within a restriction represented by the restriction information, and generating a patch at a point surrounded by the grid points;
    obtaining color measurement values by measuring the colors of the patches printed on the second medium;
    determining whether the obtained color measurement values are appropriate based on a color prediction value between the grid points;
    estimating, based on the obtained color measurement values, a color measurement value at a grid point at which the total colorant amount exceeds the restriction represented by the restriction information when the obtained color measurement values are determined to be appropriate;
    creating the color separation table based on the obtained color measurement values and the estimated color measurement value;
    obtaining a first color separation table for a first medium:
    obtaining restriction information on a total colorant amount for a second medium:
    generating a second color separation table for the second medium based on the first color separation table and the restriction information for the second medium:
    obtaining color reproducibility information for the first medium and color reproducibility information for the second medium; and
    correcting the second color separation table by color prediction based on the color reproducibility information for the first medium and the color reproducibility information for the second medium.

2. The color processing method according to claim 1, wherein the determining step comprises:
    performing color prediction for a verification region between the grid points based on the color measurement values of the patches at the grid points when all the patches at the grid points surrounding the verification region are printed;
    calculating, as a verification precision, a difference between a color prediction result of the verification region and a theoretical value;
    comparing the verification precision with a predetermined threshold;
    determining, in a case that the verification precision is lower than the predetermined threshold, that the color measurement values at the grid points surrounding the verification region are appropriate; and
    determining, in a case that the verification precision is not lower than the predetermined threshold, that the color measurement values at the grid points surrounding the verification region are appropriate.

3. The color processing method according to claim 2, wherein the color prediction result is calculated by a cellular Neugebauer process.

4. The color processing method according to claim 1, further comprising providing a message that the obtained color measurement values are not appropriate in the case that the obtained color measurement values are determined not to be appropriate.

5. The color processing method according to claim 1, wherein the first color separation table is manually created in advance.

6. The color processing method according to claim 1, further comprising:
    displaying the second color separation table; and
    displaying an image forming characteristic based on the second color separation table,
    wherein the displayed image forming characteristic is adjustable based on a user instruction.

7. The color processing method according to claim 1, further comprising forming an image with colorants of a plurality of colors on the second medium by using the second color separation table.

8. A non-transitory computer-readable storage medium having stored thereon a computer-readable program which is read and executed by a computer, the computer-readable program including a plurality of instructions that implement a color processing method, comprising:

obtaining restriction information on a total colorant amount for a second medium;

generating patches at grid points in a color space corresponding to the plurality of colorants, at which grid points the total colorant amount falls within a restriction represented by the restriction information, and generating a patch at a point surrounded by the grid points;

obtaining color measurement values by measuring the colors of the patches printed on the second medium;

determining whether the obtained color measurement values are appropriate, based on a color prediction value between the grid points;

estimating, based on the obtained color measurement values, a color measurement value at a grid point at which the total colorant amount exceeds the restriction represented by the restriction information when the obtained color measurement values are determined to be appropriate;

creating a second color separation table based on the obtained color measurement values and the estimated color measurement value;

obtaining a first color separation table for a first medium:

obtaining restriction information on a total colorant amount for a second medium:

generating a second color separation table for the second medium based on the first color separation table and the restriction information for the second medium:

obtaining color reproducibility information for the first medium and color reproducibility information for the second medium; and correcting the second color separation table by color prediction based on the color reproducibility information for the first medium and the color reproducibility information for the second medium.

9. A color processing method performed by an image forming apparatus for creating a color separation table for separating image data into data of a plurality of colorants, the method comprising:

obtaining grid points by dividing a color space corresponding to the plurality of colorants into grids;

obtaining restriction information on a total colorant amount for a medium;

generating patches at grid points at which the total colorant amount falls within a restriction represented by the restriction information;

inputting color reproduction values obtained by printing the generated patches on the medium;

estimating, based on the input color reproduction values, a color reproduction value at a grid point at which the total colorant amount exceeds the restriction represented by the restriction information;

obtaining a first color separation table for a first medium:

obtaining restriction information on a total colorant amount for a second medium:

generating a second color separation table for the second medium based on the first color separation table of the first medium and the restriction information of the second medium;

obtaining color reproducibility information for the first medium and color reproducibility information for the second medium; and correcting the second color separation table by color prediction based on the color reproducibility information for the first medium and the color reproducibility information for the second medium.

10. The color processing method according to claim 9, wherein the color reproduction value at the grid point at which the total colorant amount exceeds the restriction represented by the restriction information is estimated by nonlinear conversion based on the input color reproduction values.

11. The color processing method according to claim 9, wherein the first color separation table is manually created in advance.

12. The color processing method according to claim 9, further comprising:

displaying the second color separation table; and displaying an image forming characteristic based on the second color separation table, wherein the displayed image forming characteristic is adjustable based on a user instruction.

13. The color processing method according to claim 9, further comprising creating a color profile based on the second color separation table.

14. The color processing method according to claim 9, further comprising forming an image with colorants of a plurality of colors on the second medium by using the second color separation table.

15. A non-transitory computer-readable storage medium having stored thereon a computer-readable program which is read and executed by a computer, the computer-readable program including a plurality of instructions that implement a color processing method, comprising:

obtaining grid points by dividing a color space corresponding to the plurality of colorants into grids;

obtaining restriction information on a total colorant amount for a medium;

generating patches at grid points at which the total colorant amount falls within a restriction represented by the restriction information;

inputting color reproduction values obtained by printing the generated patches on the medium;

estimating, based on the input color reproduction values, a color reproduction value at a grid point at which the total colorant amount exceeds the restriction represented by the restriction information;

obtaining a first color separation table for a first medium:

obtaining restriction information on a total colorant amount for a second medium:

generating a second color separation table for the second medium based on the first color separation table of the first medium and the restriction information of the second medium;

obtaining color reproducibility information for the first medium and color reproducibility information for the second medium; and correcting the second color separation table by color prediction based on the color reproducibility information for the first medium and the color reproducibility information for the second medium.

* * * * *